(12) United States Patent
Currie et al.

(10) Patent No.: US 11,132,725 B2
(45) Date of Patent: Sep. 28, 2021

(54) PLATFORM FOR MANAGING ELECTRONIC PRODUCTS

(71) Applicant: NATIONWIDE MUTUAL INSURANCE COMPANY, Columbus, OH (US)

(72) Inventors: Cliff Currie, Bend, OR (US); Daniel Haber, Columbus, OH (US); David Shackleton, Corona Del Mar, CA (US)

(73) Assignee: NATIONWIDE MUTUAL INSURANCE COMPANY, Columbus, OH (US)

( * ) Notice: Subject to any disclaimer, the term of this patent is extended or adjusted under 35 U.S.C. 154(b) by 445 days.

(21) Appl. No.: 16/015,785

(22) Filed: Jun. 22, 2018

(65) Prior Publication Data
US 2018/0374131 A1    Dec. 27, 2018

Related U.S. Application Data

(60) Provisional application No. 62/524,423, filed on Jun. 23, 2017.

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0617* (2013.01); *G06Q 30/0641* (2013.01)

(58) Field of Classification Search
CPC . H04L 2209/38; H04L 9/3247; H04L 9/0637; G06Q 20/3821; G06Q 20/3829;
(Continued)

(56) References Cited

U.S. PATENT DOCUMENTS 5,446,653 A * 8/1995 Miller ............... G06Q 40/02
705/4
8,775,287 B1  7/2014 Igoe et al.
(Continued)

OTHER PUBLICATIONS

"The Insurance Implications of Blockchain," Crawford, Mark. Risk Management64.2: 24-26,28. Risk and Insurance Management Society, Inc. (Mar. 2017) Dialog #1881388609, 4pgs.*
(Continued)

*Primary Examiner* — Robert M Pond
(74) *Attorney, Agent, or Firm* — Thomas E. Lees, LLC

(57) ABSTRACT

Verified electronic products are created and distributed by an electronic platform, which includes a client interface, a creator interface, a decider interface, and a backer interface. An unverified product associated with a creator entity is received through the creator interface, where the unverified product comprises an electronic product having a set of clauses. A decider entity and backer entity are associated with the unverified product, which is converted to a verified product. The verified product is then added to a search engine associated with other previously verified products to define a collection of searchable verified products. Client information is obtained through the client interface and is used to identify a verified product from the collection of searchable verified products via the search engine. Based on the identified verified product, and instrument is built and is communicated to the client entity via the client interface for acceptance by the client entity.

18 Claims, 11 Drawing Sheets

(58) Field of Classification Search
CPC ............ G06Q 20/3825; G06Q 20/389; G06Q 30/0617; G06Q 30/0609; G06Q 30/0641; G06Q 40/08
USPC ...................................................... 705/26, 27
See application file for complete search history.

(56) References Cited

U.S. PATENT DOCUMENTS

| | | |
|---|---|---|
| 8,949,138 B2 | 2/2015 | Concannon et al. |
| 9,639,902 B2 | 5/2017 | Huehn et al. |
| 2002/0002475 A1* | 1/2002 | Freedman .............. G06Q 40/02 705/4 |
| 2009/0119133 A1* | 5/2009 | Yeransian .............. G06Q 40/08 705/4 |
| 2009/0164256 A1 | 6/2009 | Fisher et al. |
| 2013/0282406 A1* | 10/2013 | Snyder ................... G06Q 40/08 705/4 |
| 2016/0012540 A1* | 1/2016 | Pelta ...................... G06Q 40/08 705/4 |
| 2017/0103468 A1* | 4/2017 | Orsini ................... G07F 15/003 |
| 2017/0236120 A1* | 8/2017 | Herlihy .................. G06F 21/57 705/67 |
| 2017/0287090 A1* | 10/2017 | Hunn ..................... G06Q 50/18 |

OTHER PUBLICATIONS

"AIG sells first multinational insurance policy powered by Blockchain to Standard Chartered." Enterprise Innovation Questex, LLC. (Jun. 21, 2017) Dialog #1911916990 2pgs.*

* cited by examiner

PLATFORM FOR MANAGING ELECTRONIC PRODUCTS

CROSS REFERENCE TO RELATED APPLICATIONS

This application claims the benefit of U.S. Provisional Patent Application Ser. No. 62/524,423, filed Jun. 23, 2017, entitled "PLATFORM FOR MANAGING ELECTRONIC PRODUCTS", the disclosure of which is hereby incorporated by reference.

BACKGROUND

Various aspects of the present disclosure relate generally to managing electronic products, and in particular to an electronic platform that enables disaggregating a traditional model into components that are distributed across independent participants in a manner that provides participant trust through built-in conflicts resolution, checks and balances, and accountability. Further aspects of the present disclosure relate to an electronic platform that facilitates the linking, building, delivery, governance, provenance, management, combinations thereof, etc., of electronic products (including smart products), derived from components contributed by participants of a disaggregated model.

Self-reliant individuals are placing increased emphasis on trust, value, and convenience. In this regard, individuals are turning more and more to on-line interactions that minimize or eliminate interaction with people where objectivity is perceived as important. This creates challenges for entities that are vertically integrated or that have traditional value chains that are perceived as creating points where the potential for conflicts of interest affect the individual's perception of the entity.

BRIEF SUMMARY

According to several aspects of the present disclosure, a computer-implemented process for creating and distributing verified electronic products comprises providing an electronic platform, which includes several interfaces. In an example implementation, the platform includes a client interface, and a set of provider interfaces. The set of provider interfaces includes a creator interface, a decider interface, and a backer interface. Further, the process includes receiving an unverified product associated with a creator entity through the creator interface, wherein the unverified product comprises an electronic product, e.g., a digital document having a set of clauses. A decider entity having credentials that correspond to the set of clauses is selected and associated with the unverified product. The decider entity is notified of the association through the decider interface. In this regard, the decider interprets the set of clauses against client requests (e.g., client claims). Similarly, a backer entity having credentials qualified by the electronic platform to back the set of clauses is selected and associated with the unverified product. The backer entity is notified of the association through the backer interface. In this regard, the backer entity backs decisions of the decider entity. After associating the unverified product with the selected decider entity and the selected backer entity, the unverified product is converted to a verified product, which is added to a search engine associated with other previously verified products to define a collection of searchable verified products. Client information is obtained through the client interface and is used to identify a verified product from the collection of searchable verified products via a search engine. Based on the identified verified product, an instrument is built and communicated to the client entity via the client interface for acceptance by the client entity.

DETAILED DESCRIPTION

Figure 1:
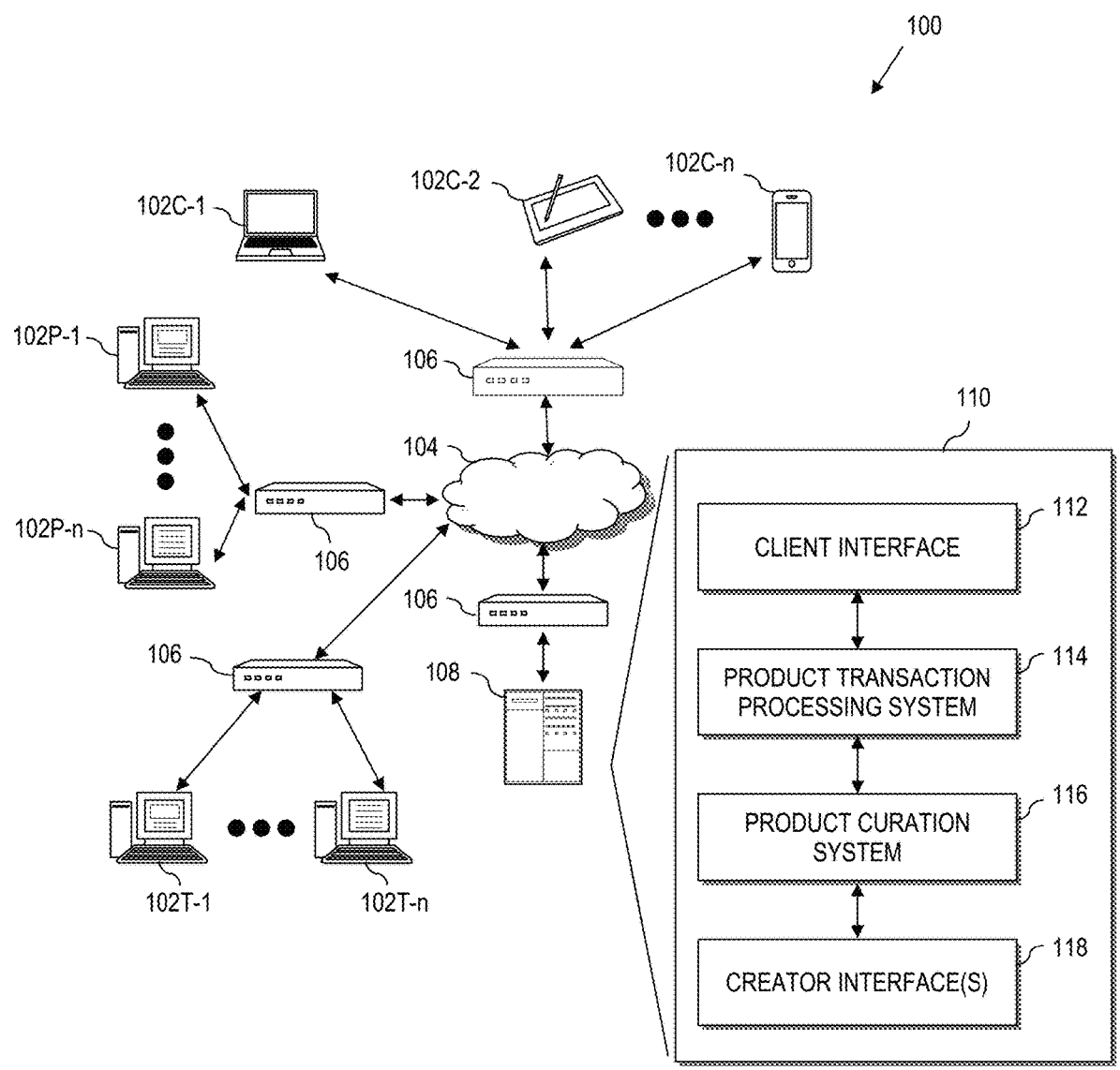
FIG. 1 is a block diagram of an example electronic platform that facilitates the linking, building, delivery, governance, provenance, management, combinations thereof, etc., of electronic products (including smart products), derived from components contributed by participants of a disaggregated model, according to aspects of the present disclosure.

According to aspects of the present disclosure, an electronic platform enables disaggregating a traditional model into components that are distributed across independent participants in a manner that provides participant trust through built-in conflicts resolution, checks and balances, and accountability. According to further aspects of the present disclosure, an electronic platform is provided that facilitates the linking, building, delivery, governance, provenance, management, combinations thereof, etc., of electronic products (including smart products), derived from components contributed by participants of a disaggregated model. Further aspects of the present disclosure enable the electronic platform to recommend electronic products managed thereby to client entities based upon automatically discovered data.

The disclosure herein addresses a technical problem of integrating components generated by distributed, independent contributors, based upon a disaggregated model, e.g., a vertically integrated model that traditionally comprises a single source (or few sources).

According to aspects of the present disclosure herein, this technical problem is solved by an electronic platform that links multiple (i.e., two or more) independent, distinct, and distributed network systems to construct an electronic product, e.g., an electronic policy, smart electronic policy, etc., as described more fully herein. Further aspects of the present disclosure solve the problem by providing a curation platform that facilitates the linking, building, delivery, governance, provenance, management, combinations thereof, etc., of electronic products (including smart products), derived from components contributed by participants of the disaggregated model. Further aspects of the present disclosure solve the problem by configuring the electronic platform to recommend electronic products managed thereby to client entities based upon automatically discovered data. Yet further aspects herein solve the problem by providing a framework that builds participant trust through built-in conflicts resolution, checks and balances, accountability, combinations thereof, etc.

In this regard, aspects of the present disclosure solve the technical problem by providing a framework to build an electronic product (e.g., based upon a product template) using contributions by multiple independent contributors. The electronic product is maintained by an independent product curation system. The product curation system interacts with an advisory portal to identify target client entities that may be interested in the electronic product.

In an example implementation, the product curation system disaggregates contributions necessary to construct an electronic product into three components, each component handled by an independent entity across the distributed network system (e.g., creator entity, decider entity, and backer entity). A trusted host platform provides at least three independent interfaces, each interface corresponding to a role associated with a corresponding disaggregated component of the electronic product.

More particularly, the platform links electronic product participants, including an electronic product creator entity, a backer entity, and a decider entity to a common electronic product and disaggregates an operational feature of the electronic product and/or role associated with interaction with the electronic product to each participant of the electronic product. Thus, the electronic product creator entity can be independent to the backer entity and the decider entity. The backer entity can be independent to the creator entity and the decider entity. Likewise, the decider entity can be independent to the creator entity and the backer entity.

In some embodiments, the platform provides an interface for a fourth role, e.g., a regulator entity, to validate or otherwise verify the electronic product before posting the electronic product as available.

In some embodiments, the electronic platform further solves the technical problem by executing a product filter that filters unverified products prior to being converted to a verified product. The product filter can be configured to utilize analytics to filter unverified products based upon an evaluation of clauses contained in the corresponding unverified product. The product filter can also serve as a screen or a vetting application to evaluate and potentially disqualify candidate decider entities and/or candidate backer entities based upon pre-determined credentials, criteria, predetermined factors, combinations thereof, etc.

Aspects of the present disclosure also improve the technology of electronic product creation, verification, and distribution. In particular, various aspects of the present disclosure solve a problem of creating electronic products that pass between different entities. The present disclosure herein provides a technical solution that utilizes a trusted platform to distribute electronic product creation among independent and distributed network resources. The trusted platform can optionally further integrate a regulation and/or verification process to verify an electronic product thus creating a smart electronic product that preserves provenance, enables free mobility among participants that interact to create the electronic product, and that facilitates a governance that allows only a finite number of instances to be consumed by client entities before the electronic product expires.

Various aspects of the present disclosure also address the technical problem of data security in distributed electronic products. Aspects of the present disclosure solve this technical problem by allocating a unique key to each participant that interacts with a verified electronic product on the electronic platform. A distributed electronic ledger (e.g., using blockchain) is digitally signed by each participant that contributes to the creation of a verified electronic product, a request against the verified electronic product, a transaction against the verified electronic product, combinations thereof, etc., using the allocated unique key.

According to further aspects of the present disclosure, the technical problem of data security in distributed electronic products is solved by implementing verified electronic products having a limited lifespan (e.g., in number of instantiations, time, or a combination thereof).

The technical solutions herein bring about several technical effects. For instance, by disaggregating electronic product operational features among independent participants, conventional value chains are broken, thus eliminating conflicting interests of an entity associated with the electronic product.

Other technical effects, technical problems and corresponding technical solutions are set out in greater detail herein.

System Overview

Referring now to the drawings and in particular to FIG. 1, a general diagram of a system 100 is illustrated according to various aspects of the present disclosure. The illustrated system 100 is a special purpose (particular) computing environment that includes a plurality of hardware processing devices (designated generally by the reference 102) that are linked together by one or more network(s) (designated generally by the reference 104).

The network(s) 104 enable communications links between the various processing devices 102 and may be supported by networking components 106 that interconnect the processing devices 102. Here, the network(s) 104 may comprise connections using one or more intranets, extranets, local area networks (LAN), wide area networks (WAN), wireless networks (WiFi), the Internet, including the worldwide web, cellular, and/or other arrangements for enabling communication between the processing devices 102, in either real time or otherwise (e.g., via time shifting, batch processing, etc.). Networking components 106 include for example, routers, hubs, firewalls, network interfaces, wired or wireless communications links and corresponding interconnections, cellular stations, and corresponding cellular conversion technologies (e.g., to convert between cellular and TCP/IP, etc.).

A processing device 102 can be implemented as a server, personal computer, laptop computer, netbook computer, purpose-driven appliance, special purpose computing device, and/or other device capable of communicating over the network(s) 104. Other types of processing devices 102 include for example, personal data assistant (PDA) processors, palm computers, cellular devices including cellular mobile telephones and smart telephones, tablet computers, etc.

The illustrative system 100 includes a processing device implemented as a server 108 (e.g., a web server, file server, and/or other processing device) that executes an electronic platform 110. The electronic platform 110 enables disaggregating a traditional model into components that are distributed across independent participants in a manner that provides participant trust through built-in conflicts resolution, checks and balances, and accountability. In this regard, the electronic platform 110 facilitates the linking, building, delivery, governance, provenance, management, combinations thereof, etc., of electronic products (including smart products), derived from components contributed by participants of a disaggregated model.

For the sake of clarity of discussion, a first group of processing devices 102 represent client devices operated by client entities, and such client devices are further designated 102C-1, 102C-2, ... 102C-n etc. Likewise, certain ones of the processing devices 102 are executed by participants, e.g., creator entities, decider entities, backer entities, provider entities, content contributors, etc., and such client devices are further designated 102P-1 ... 102P-n, etc. Further, certain ones of the processing devices 102 provide third party interaction discussed in greater detail herein, and such third-party devices are further designated 102T-1 ... 102T-n, etc.

In the example implementation as illustrated, the platform 110 includes a client interface 112 for interfacing with client devices, e.g., 102C-1, 102C-2, etc.

The client interface 112 connects client devices 102C-1, 102C-2, etc., to a product transaction processing system 114. The product transaction processing system 114 can function as an advisory portal for providing recommendations of available verified electronic products to a client entity interacting with the electronic platform 110 via the client interface 112. The product transaction processing system 114 essentially finds and recommends electronic products that are consumed by client entities. The product transaction processing system 114 can also provide other tasks, such as client entity data mining (e.g., by automatically interacting with the third-party devices 102T-1 ... 102T-n), electronic file management, etc., as will be described in greater detail herein.

The product transaction processing system 114 interacts with a product curation system 116. The product curation system 116 serves as a trusted intermediary that brings together distributed, independent third parties for electronic product creation, backing, management, verification, and combinations thereof.

In this regard, content contributors 102P-1, 102P-2, etc., interact with the product curation system 116 via one or more provider interface(s) 118. As such, each entity interacting with the electronic platform 110 has a different role and different capabilities within the electronic platform 110 as described more fully herein.

Example Platform Overview

Figure 2:
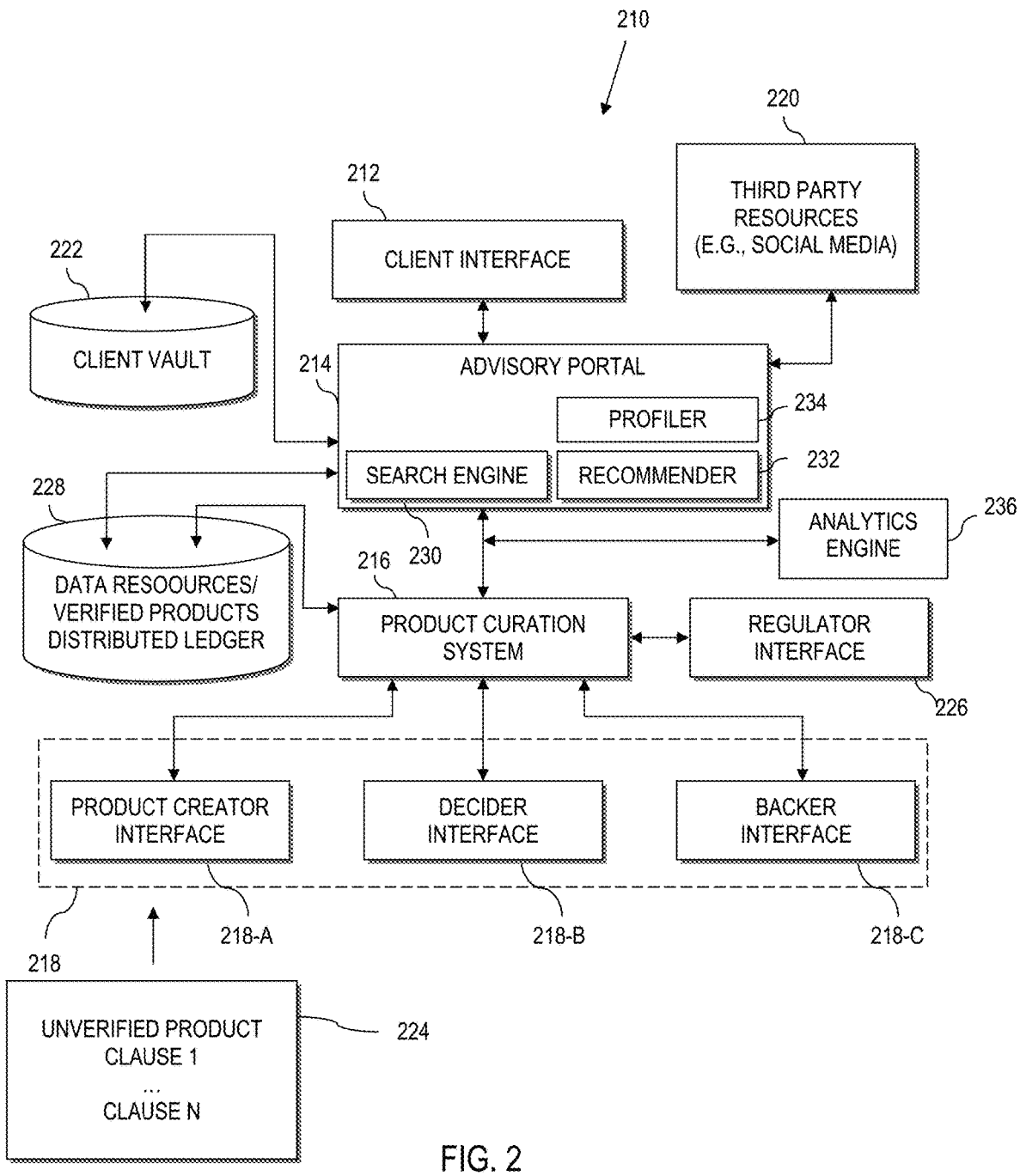
FIG. 2 is a block diagram of an example implementation of the electronic platform of FIG. 1, according to aspects of the present disclosure.

Referring to FIG. 2, an example configuration illustrates an electronic platform 210 that disaggregates a conventional model used to build and execute electronic products. The platform 210 can be used in place of the platform 110 within the system of FIG. 1. As such, like structure is illustrated with like reference numbers 100 higher.

The platform 210 is well suited for disaggregating an industry value chain to remove conflicts of interest in processing electronic products, such as may be found in electronic policies. For instance, an electronic policy may be utilized to represent an insurance policy. Unfortunately, some individuals may distrust insurance policies because there is often no independence between the creator of an insurance policy, a claim adjuster that approves or denies claims against the insurance policy, and the investor that underwrites the policy and puts up the capital to support the policy.

The platform includes a client interface 212 (analogous to the client interface 112 of FIG. 1), a product transaction processing system implemented in the context of an advisory portal 214 (analogous to the product transaction processing system 114 of FIG. 1), a product curation system 216 (analogous to the product curation system 116 of FIG. 1), and provider interface 218 (analogous to the provider interfaces 118 of FIG. 1). Here, provider interfaces 218 are implemented as a product creator interface 218-A, a decider interface 218-B, and a backer interface 218-C.

In the example configuration, the advisory portal 214 executes a matching engine that analyzes client data (i.e., client information) of a client entity that is interacting with the platform 210 via the client interface 212. The advisory portal 214 can also execute the matching engine to analyze client data of client entities that have an account associated with the platform, regardless of whether the client entity is actively on-line via the client interface 212.

For instance, a client entity interacting through the client interface 212 (such as a graphical user interface) can provide detailed profile information that provides information about the client entity. Based upon the profile information, the advisory portal 214 can use data mining and exploratory evaluations to obtain other details about the client entity, extract patterns, trends, needs, requirements, etc. Such data can be derived by querying (e.g., using OAuth) third-party resources 220 (e.g., social media sites, credit reports, banking accounts, financial accounts, etc.; see third party third party devices 102T-1 ... 102T-n of FIG. 1) to learn about the client entity. Here, discovered information can be matched to profile criteria. The collected data can optionally be presented to the client entity for verification, authorization, authentication, etc. In the example implementation, the client entity profile is stored in a client vault 222 so that the advisory portal 214 can periodically extract client information, e.g., to analyze or re-analyze existing products accessible by the product curation system 216.

The product creator interface 218-A provides a graphical client interface that is intended for use by product creator entities. In this regard, a portal provides access for product creator entities to create an account, log in with a secure login, access templates for product creation (e.g., of an unverified electronic product 224) and engage in product interactions to release electronic products into the product curation system 216.

The decider interface 218-B provides an interface (e.g., graphical user interface) that allows independent decider entities to log in, upload applications to function as a decider entity on associated electronic products. In general, a decider entity receives a client request to evaluate a claim against one or more clauses of a verified electronic product associated with client entity, to upload decisions against a client request (e.g., for claims (i.e., actionable feedback)) made against electronic products for which a decider entity is associated, etc.

The backer interface 218-C provides an interface (e.g., graphical user interface) that allows independent backer entities to log in, upload applications to be a backer entity on an associated product (or associated products) to interact with electronic products in the role/context of a backer entity, etc. In general, upon a decision by a decider entity to approve a client request (e.g., a claim against a verified electronic product such as a smart policy), the backer entity executes a transaction with the electronic platform 210, and the electronic platform 210 executes a corresponding transaction with the client entity via the client interface 212 to resolve the client request.

In example implementations, the product creator entity 218-A uploads unverified products 224 to the product curation system 216. The product curation system 216 then facilitates associating the unverified electronic product with a decider entity via the decider interface 218-B and with a backer entity via the backer interface 218-C. Here, the product curation system 216 can execute a filter, electronic product flow and control, analytics, and other processing as will be described in greater detail herein.

Before the production curation system 216 can make the product available to client entities, it may be necessary or preferable to obtain a verification of the electronic product. In this regard, the product curation system 216 optionally reviews the uploaded electronic product, then submits the electronic product for verification (e.g., authorization by a regulator entity (e.g., state, federal, or other jurisdictional regulation agency)) that interacts with the platform 210 via a regulator interface 226 of the platform. In some embodiments, it is envisioned that the regulator entity may be an automated process (e.g., a process that follows a flow chart to determine if the product meets regulations). In various embodiments, the regulator entity may be a combination of an automated process (e.g., for preliminary approval) and a regulation agency (e.g., for final approval).

Further, in several embodiments, the product curation system 216 acts as an underwriter of a verified product. Here, the product curation system 216 evaluates clauses, terms, and other features of an unverified document. The product curation system 216 can also vet the associated decider entity and/or backer entity, e.g., via filtering and other processing. In various embodiments, the electronic platform 210 includes an underwriter interface that an underwriter entity may use to access the platform, similar to the other interfaces described herein. In numerous embodiments, the underwriter entity may access the platform via one of the other existing interfaces (e.g., the creator interface).

The product curation system 216 stores verified products in a data resource 228, e.g., a database, databases, object store, etc. The data resource 228 can also be utilized to store a distributed electronic ledger associated with verified electronic products, as will be described in greater detail herein.

In an example implementation, the advisory portal 214 can interact with the client vault 222 and the data resource 228 e.g., using a search engine 230 to search the verified electronic products in the data resource 228 using client data collected from the client vault 222 to identify products that may be of use to the client entity. Then, a recommender system 232 recommends which of the identified products to show to the client entity through the client interface 212. In some embodiments, the recommender system 232 recommends instruments, which are built from the selected product (or products) to the client entity instead of the products themselves, as described herein.

In certain embodiments, the advisory portal 214 also comprises a profiler 234. The profiler 234 continuously scans third party resources 220 to update a profile based upon a client profile stored in the client vault 222. Here, the client profile stored in the client vault 222 can be continuously updated regardless of whether the recommender 232 makes a recommendation.

Still further, the electronic platform 210 can comprise an analytics engine 236. The analytics engine 236 can be used to assist the product curation system 216, the recommender 232, the profiler 234, other electronic platform components, combinations thereof, etc. The analytics engine 236 can facilitate underwriting, rules processing, data manipulation, machine learning, and other processing necessary to carry out functions of the electronic platform 210, examples of which are set out in greater detail herein.

Distributed Ledger

In certain illustrative embodiments, the electronic product is implemented using distributed ledger constructs. Here, the distributed ledger enables the use of a distributed database that maintains entries that are resistant to modification. That is, once an entry is timestamped, the underlying data cannot be changed. This enables the documentation of provenance information associated with an electronic product. Also, the creation of a distributed ledger facilitates transactions between independent sources, enabling the ability to disaggregate an electronic product into corresponding functionality.

Client Recommendations

In certain example embodiments, the advisory portal 214 utilizes the profiler 234 to execute an update process that continually runs such that the advisory portal 214 cyclically evaluates: local client information, client information from third-party resources, a client profile stored in the client vault 222, products associated with the product curation system 216, combinations thereof, etc.

This data collection and profiling enables the recommender 232 to make optimization decisions. If a better product becomes available (e.g., based upon matching criteria, rules, statistical analysis, client profile information, etc.), then the changes can be presented to the client entity for approval. If approved, the advisory portal 214 automatically changes the product(s) associated with the client entity.

According to further aspects of the present disclosure, the advisory portal 214 utilizes associative linking to support the underlying analysis associated with recommendations so that, where practical, annotations are available for client inspection. Introspection provided by the advisory portal 214 allows a client entity to review a recommendation and to see the factors that drove the decision based around the recommendation. For instance, a line-by-line rationale can be presented via a graphical client interface so that a client entity can review the factors that drove a recommendation. By way of example, if the advisory portal 214 recommends a new product that decreases insurance coverage on a vehicle (e.g., by lowering coverage or increasing a deductible), an attribution such as an on-line appraisal showing a decrease in the current market value of the client entity's vehicle can justify the recommendation.

According to still further aspects of the present disclosure, the advisory portal 214 only interacts with verified electronic products associated with the product curation system 216. In this regard, the product curation system 216 configures products to be freely navigable, allowing a client entity to instantly make changes (e.g., at any time, at preset intervals (e.g., daily, weekly, monthly, etc.), etc.). Here, changes may be to an entirely different verified product or to modifiable parameters of an existing product. This allows a client entity to migrate freely between verified electronic products with different clauses, different entities, different parameter (i.e., clause) values, etc.

Introduction to Example Electronic Platform Use

Figure 3:
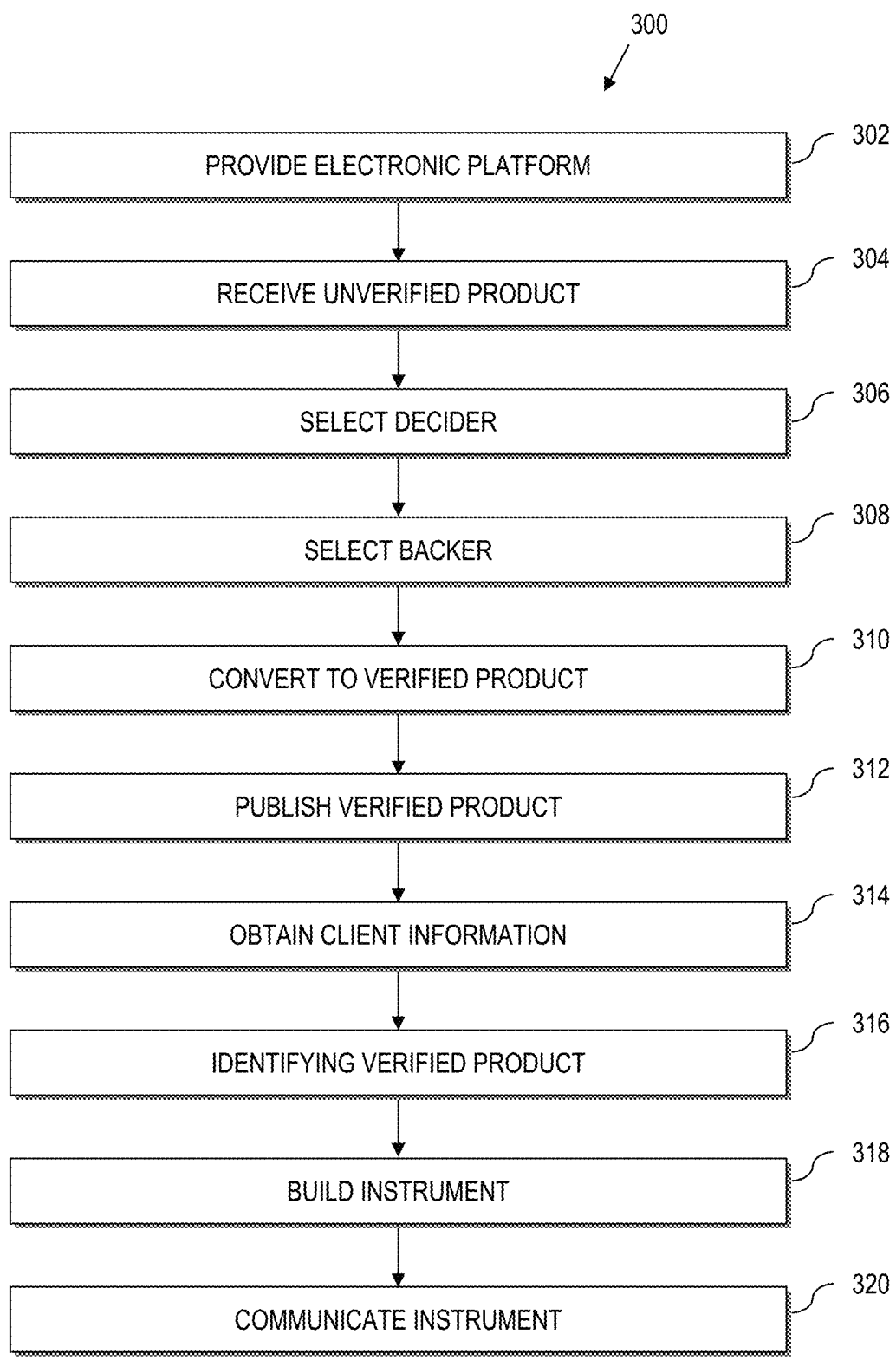
FIG. 3 is a flow chart illustrating an example use of the electronic platform of FIG. 1 and/or FIG. 2, according to aspects of the present disclosure.

Referring to FIG. 3, a computer-implemented process 300 for creating and distributing verified electronic products can be carried out on the electronic platform 110 (FIG. 1) or 210 (FIG. 2). In this regard, the computer-implemented process 300 may be implemented on computer-readable hardware that stores machine-executable program code, where the program code instructs a processor to implement the described process. The computer-implemented process 300 may also be executed by a processor coupled to memory, where the processor is programmed by program code stored in the memory, to perform the described process. Here, the process 300 can be executed on the platform 110 (FIG. 1) or the platform 210 (FIG. 2). As such, example structure is provided by reference back to the elements of the block diagram of FIG. 2 for purposes of illustration, not by way of limitation.

The process 300 comprises providing at 302 an electronic platform having a client interface and a set of provider interfaces. The provider interfaces comprise a creator interface, a decider interface, and a backer interface. See for instance, the electronic platform 210, client interface 212, product creator interface 218-A, decider interface 218-B, and backer interface 218-C.

The process 300 also comprises receiving at 304, through the creator interface, an unverified product (e.g., unverified product 224 of FIG. 2) associated with a creator entity, where the unverified product comprises an electronic product having a set of clauses.

The process 300 also comprises selecting at 306, a decider entity having credentials qualified by the electronic platform based upon the set of clauses of the unverified electronic product. Here, the process 300 performs associating the selected decider entity with the unverified product, and notifying the selected decider entity of the association through the decider interface. Once selected, the decider entity interprets the set of clauses against client requests, as described more fully herein.

The process 300 comprises selecting at 308, a backer entity having credentials qualified by the electronic platform to back the set of clauses. Here, the process 300 performs associating the selected backer entity with the unverified product and notifying the selected backer entity of the association through the backer interface. Once selected, the backer entity backs decisions of the decider entity, as described more fully herein.

The process 300 further comprises converting at 310, the unverified product to a verified product after associating the unverified product with the selected decider entity and the selected backer entity.

As will be described in greater detail herein, converting the unverified product to a verified product can comprise delivering to the creator entity, a unique creator key; delivering to the decider entity, a unique decider entity key; and delivering to the backer entity, a unique backer entity key. Here, the process can build the verified product using distributed ledger technology such that each time the creator entity interacts with the verified product, the creator entity signs the interaction in the distributed ledger with the unique creator key, each time the decider entity interacts with the verified product, the decider entity signs the interaction in the distributed ledger with the unique decider entity key, and each time the backer entity interacts with the verified product, the backer entity signs the interaction in the distributed ledger with the unique backer entity key.

The process 300 also comprises publishing at 312, the verified product to the electronic platform by adding the verified product to a search engine associated with other previously verified products to define a collection of searchable verified products.

The process 300 still further comprises obtaining at 314, through the client interface, information about a client entity. By way of example, data can be obtained by a profiler 234 that obtains data directly from the client entity, or via independent, dynamic data gathering from third-party resources 220, e.g., as set out in greater detail herein.

The process 300 also comprises identifying at 316, a verified product from the collection of searchable verified products by interacting with the search engine based upon the obtained client information.

The process 300 still further comprises building at 318, an instrument based on the identified verified product. Here, an instrument can be the same as a verified document. In other embodiments, an instrument can be different from a verified document, e.g., a portal page linking to a selected verified document, an electronic file containing information about the selected verified document, links or other information providing recommendation attribution (about the client data that drove a recommendation, attribution data about participants, e.g., the creator entity, decider entity, backer entity, etc.), etc. As another example, the instrument can include a link to, reference to, or otherwise provide associated with the identified verified product, at least one of a profile of the creator entity, a profile of the decider entity, and a profile of the backer entity.

Also, the process 300 comprises communicating at 320 the instrument to the client entity via the client interface for acceptance by the client entity. For instance, a client entity may have a customized portal page with dashboard style views of information that is presented to the client entity via the client interface. In other examples, files are electronically transferred to the client entity via the client interface, etc.

In an example implementation, the process 300 further comprises utilizing a regulator interface to interface with an independent regulator entity. Here, converting the unverified product to a verified product further comprises converting the unverified product to a verified product when the unverified product meets target regulations as determined by the regulator entity, wherein verification is performed independently of the creator associated with the unverified product and the target regulations are selected based upon the defined set of clauses in the unverified product.

As a further example, the process 300 may comprise receiving an electronic request against the verified product from the client entity via the client interface, the electronic request comprising information that relates to at least one clause of the verified electronic product. Here, the process 300 comprises transmitting the electronic request to the decider entity via the decider interface, receiving an electronic decision response from the decider entity via the decider interface with regard to the electronic request, reporting the decision response to the client entity via the client interface, and triggering an action from the backer entity via the backer interface if the decision response from the decider entity indicates that an electronic transaction from the backer entity is required.

Keeping with the above-example, the process may further process the request by implementing the verified product on a distributed ledger, updating the distributed ledger based upon the electronic request, which is digitally signed by the client entity, updating the distributed ledger based upon the electronic decision response, which is digitally signed by the decider entity, and updating the distributed ledger based upon the electronic transaction if required by the decision response from the backer entity, which is digitally signed by the backer entity.

According to further aspects of the present disclosure, interactions can be rated using a rating system. However, to make sure that unfair bias is removed from the ratings, the electronic platform objectifies participant rating values. For instance, the process can implement objectified rating by creating a decider entity profile associated with the decider entity, receiving a rating of the decider entity from at least one of: the client entity, the creator entity, and the backer entity, objectifying the received rating using a predetermined formula based on the verified product and the decision response, and associating the objectified rating with the decider entity profile. Ratings can also be carried out for the client entity, creator entity, backer entity, the platform itself, etc., by analogy. For instance, the process may objectify ratings by generating a client profile associated with the client, generating a creator profile associated with the creator entity, generating a decider entity profile associated with the decider entity, and generating a backer entity profile associated with the backer entity. The process further objectifies by receiving a rating from any one of the client entity, creator entity, decider entity, and backer entity a rank pertaining to any one or more of the remaining ones of the client entity, creator entity, decider entity, and backer entity. Here, the process performs objectifying the received rating using a predetermined formula based on the verified product, and associating the objectified rating with corresponding one of the client profile, creator profile, decider entity profile, and backer entity profile.

According to yet further example implementations, converting the unverified product to a verified product comprises delivering to the creator entity, a unique creator key, delivering to the decider entity, a unique decider entity key, delivering to the backer entity, and a unique backer entity key. Here, the verified product can be built using a distributed ledger such that each time the creator entity interacts with the verified product, the creator entity signs the interaction into the distributed ledger with the unique creator key, each time the decider entity interacts with the verified product, the decider entity signs the interaction into the distributed ledger with the unique decider entity key, and each time the backer entity interacts with the verified product, the backer entity signs the interaction into the distributed ledger with the unique backer entity key. In this regard, objectifying a received rating can comprises electronically comparing information in the distributed ledger against the verified document.

Process Flow 1—Example Electronic Product Creation

Figure 4:
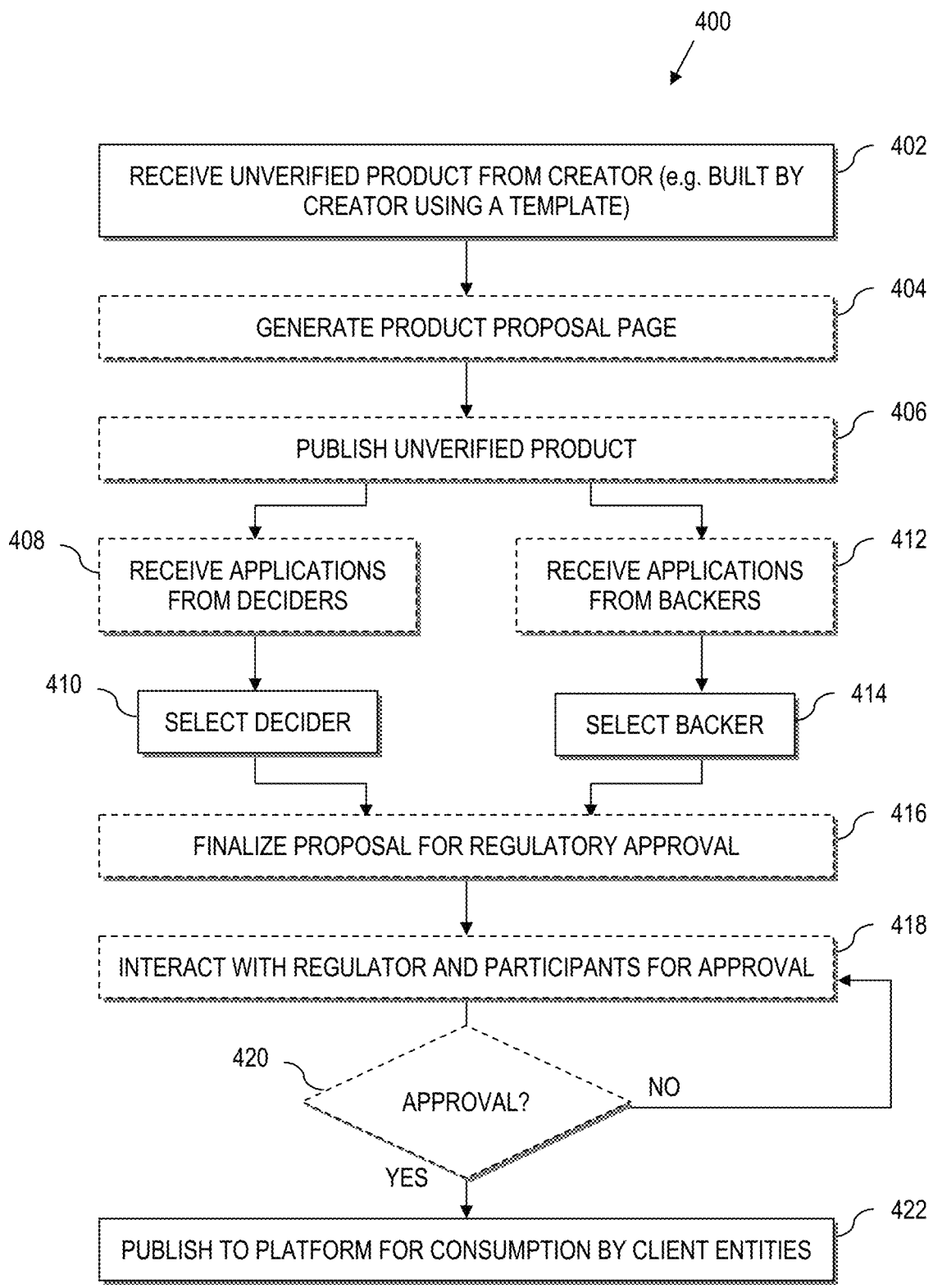
FIG. 4 is a flowchart illustrating a computer-implemented process for creating and making electronic products available to the product transaction processing system of FIG. 1 and/or the advisory portal of FIG. 2, according to aspects of the present disclosure.

Referring now to FIG. 4, a computer-implemented process 400 is provided for creating a verified electronic product. In this regard, the computer-implemented process 400 may be implemented on computer-readable hardware that stores machine-executable program code, where the program code instructs a processor to implement the described process. The computer-implemented process 400 may also be executed by a processor coupled to memory, where the processor is programmed by program code stored in the memory, to perform the described process. Here, the process 400 can be executed on the platform 110 (FIG. 1) or the platform 210 (FIG. 2). Also, the process 400 can be implemented as part of, or in conjunction with, the process 300 of FIG. 3.

In the process 400 of FIG. 4, assume that a product creator (i.e., creator entity) has an idea for a new electronic product (e.g., a new policy). With brief reference to FIG. 2, if the creator is new to the platform, the creator logs into the platform 210 using the creator interface 218-A and creates an account. The product curation system 216 generates a private key that is communicated to the creator for authentication.

Referring now to FIG. 2 and FIG. 4 generally, at 402, the product curation system 216 receives from the creator via the creator interface 218-A, a new unverified electronic product 224 (e.g., an electronic policy). In example implementations, the electronic policy is a smart policy created using a distributed ledger as described more fully herein. In certain example implementations, the creator entity creates and uploads the electronic product, which may be built using a template or templates made available to the creator by the product curation system 216.

At 402, the product curation system 216 can optionally filter the unverified document for technical issues, e.g., to underwrite the unverified document, provide other necessary screening to make sure the submitted unverified document meets predefined criteria of the product curation system 216, evaluate the unverified document against rules, procedures, qualifications, etc.

At 404, the product curation system 216 exposes unverified products. In an example implementation, the product curation system 216 generates a product proposal page, thus designating a product proposal. For instance, the creator can upload to the product curation system 216, an electronic product proposal for the new electronic product. In certain example embodiments, the creator creates a proposal page within the product curation system 216 and submits the proposal page to the product creation system for approval. The product curation system 216 can optionally approve or reject the new electronic product. In other example embodiments, a product proposal page can combine multiple electronic products into a single proposal, e.g., to define an index, etc. This can mitigate liability and exposure via association with a single electronic product.

Keeping with the above-example implementation, at 406, the product curation system 216 publishes information regarding the new product proposal. Publication is typically limited to decider entities, backer entities, or both.

In an example optional implementation, at 408, the product curation system 216 can optionally receive applications from decider entities via the decider interface 218-B. The product curation system 216 can thus evaluate decider entity applicants and implement a qualifications and approval mechanism. As such, receiving applications at 308 is optional. In this implementation, the product curation system 216 may accept applications from decider entities for a limited time.

At 410, a decider is selected. In an example implementation, the product curation platform 216 selects the decider entity. Alternatively, the creator selects (or participates in selecting) a decider entity that has been vetted by the product curation system 216. In this manner, the creator can select the decider entity, but the creator and the decider entity are otherwise independent of each other.

In another example implementation, at 410, the product curation system 216 selects a decider entity by assigning a decider entity to the new product proposal. In this regard, the selection of the decider entity is removed from the responsibility and right of the creator. In another example implementation, the product curation system 216 generates a list of approved decider entities. The creator then selects at 410, a decider entity from the list. Here, the product curation system 216 facilitates the exchange between the creator and decider entity(s) via the creator interface 218-A and the decider interface 218-B. In yet further example configuration, multiple decider entities can be selected and added to a list. The list is made available to client entities of the corresponding verified electronic product when obtaining the product or when making a client request so that the client entity can select the decider entity that evaluates a submitted client request.

As with the creator entity, if a decider entity is new to the platform, the product curation system 216 can create a decider entity account and assign a unique private key to the new decider entity.

Analogously, the product curation system 216 can invite backer entities to participate in the unverified electronic product associated with the new proposal.

At 412, the product curation system 216 receives applications from backer entities (e.g., via the backer interface 218-C) that want to back the unverified electronic product associated with the proposal.

At 414, a backer entity is selected. Here, the ultimate decision may be made by the creator entity. In other example implementations, the creator entity is removed from the selection of the backer entity. For instance, the product curation system 216 can assign the backer entity. In this regard, the selection of the backer entity is removed from the responsibility and right of the creator entity. In further embodiments, multiple backer entities can be selected, e.g., added to a list of eligible backer entities for the product. In other embodiments, a client entity may choose a backer entity or select from a list of approved, eligible backer entities of a corresponding verified electronic product, e.g., when the client entity makes a decision to obtain the verified product.

In some embodiments, unverified products are pooled together such that a single backer entity may participate in the pooled verified products. In other embodiments, unverified products are pooled together, and several backer entities are pooled such that the pool of backer entities participates in the pooled verified products. As such, the pool of unverified products is divided into shares, and backer entities may participate in one or more shares.

As with the creator entity and decider entity, if a backer entity is new to the platform, the product curation system 216 can create a backer entity account and assign a unique private key to the new backer entity.

Once the product curation system 216 links the new proposal with a decider entity and a backer entity, the proposal is ready for further processing. In certain embodiments, the electronic product may be ready for exposure to client entities. In this instance, the new electronic product is converted to a verified electronic product and is exposed to the advisory portal 214 (e.g., by publishing the new electronic product to a distributed ledger).

In other embodiments, regulatory approval may be required. Here, at 416, the product curation system 216 finalizes the proposal for regulatory approval. Finalizing may require no processing other than to initiate the workflow for regulation approval. In other example embodiments, finalization may require obtaining additional information, electronically filling out regulation forms, applications, etc., and taking other necessary actions as required by the regulatory entity.

Where regulatory approval is required, at 418, the product curation system 216 interacts with the regulator entity, the participants, or a combination thereof to obtain regulatory approval of the electronic product. Here, interacting with the participants includes interacting with the creator, the selected backer entity, the selected decider entity, or a combination thereof.

The regulator entity can interact with the platform 210 to review processes and constraints associated with an electronic product, e.g., via the subject matter of the electronic product, the clauses therein, etc. The regulator entity can approve the electronic product or require changes. In this regard, the platform 210 provides the necessary compliance documentation to the regulator entity across all electronic projects. As such, in an example implementation, the platform 210 schedules reviews with the regulator entity to review the proposal. The regulator entity reviews the proposal and decides based upon predetermined guidelines. If the proposal is approved by the regulator entity, the platform marks the electronic product as verified, e.g., by writing a blockchain record. The platform 210 may also periodically generate reports and other data to maintain compliance with the regulator entity.

At 420, a decision is made as to whether approval of the electronic product has been achieved. If not, the process 400 continues to interact at 418 to obtain approval.

If approved at 420, the product curation system 216 publishes at 422, the electronic product as a verified electronic product to the advisory portal 214.

As will be described in greater detail herein, client entities interacting with the advisory portal 214 via the client interface 212 can obtain, e.g., purchase, the electronic product and participants (including the client entity) may get paid alongside each premium or in response to payment of premiums.

In an example configuration, the electronic product is consumable by client entities. When a predetermined number of client entities purchase the electronic product (i.e., the conveyance of electronic product instances reaches a limit or otherwise exceeds a threshold), the product curation system 216 takes a predetermined action. The product curation system 216 can start a new round of product instances, e.g., potentially with new decider entity/entities, backer entity/ entities, etc., e.g., based upon executing one or more steps of FIG. 4.

In another example implementation, a verified electronic product can time-out or expire based upon passage of time, e.g., where a time on the marketplace exceeds a threshold, then that electronic product is automatically removed from the advisory portal 214 (i.e., removed from the marketplace). Here, the platform 210 can issue another copy of the electronic product. The new instance may require re-approval or rebuilding of the decider entity and backer entity. In this regard, one or more steps of the above process 400 can repeat for a new round with the electronic product. In other example implementations, the new round of the electronic product is re-released into the marketplace.

In another example configuration, the now verified electronic product can be added to a platform marketplace that is maintained by the advisory portal 214, e.g., data resource 228.

In an example configuration, a client entity sees the electronic product is a recommendation issued by the advisory portal 214, possibly along with other electronic products made available on a platform marketplace. The client entity can then opt to purchase one or more electronic products.

Process Flow 2—Example Client Interaction

Figure 5:
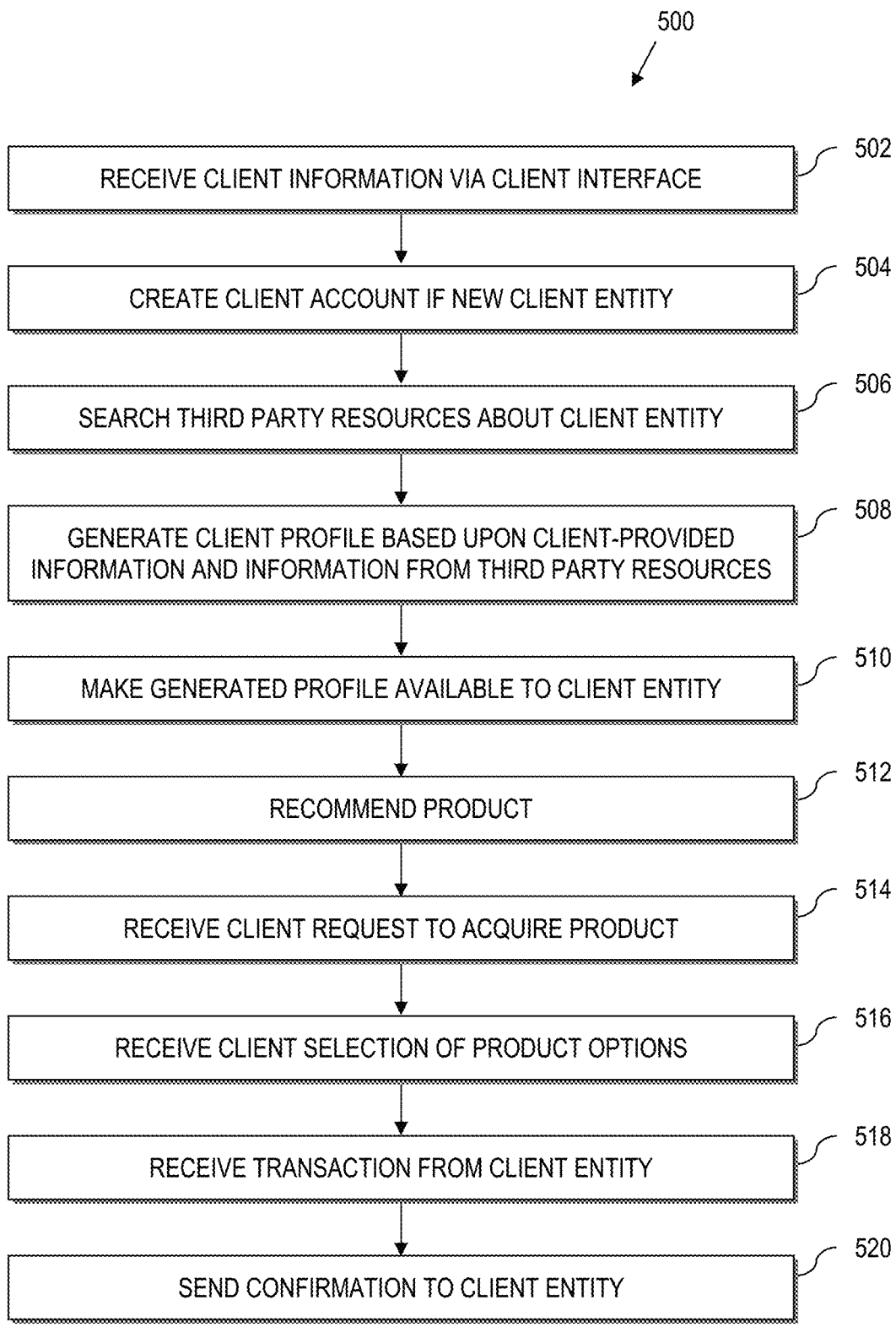
FIG. 5 is a flowchart illustrating a computer-implemented process for client interaction with the product transaction processing system of FIG. 1 and/or the advisory portal of FIG. 2, according to aspects of the present disclosure.

Referring now to FIG. 5, a computer-implemented process 500 is provided for implementing a client experience with the platform 110 (FIG. 1) or platform 210 (FIG. 2). In this regard, the computer-implemented process 500 may be implemented on computer-readable hardware that stores machine-executable program code, where the program code instructs a processor to implement the described process. The computer-implemented process 500 may also be executed by a processor coupled to memory, where the processor is programmed by program code stored in the memory, to perform the described process. Here, the process 500 can be executed on the platform 110 (FIG. 1) or the platform 210 (FIG. 2). Also, the process 500 can be implemented as part of, or in conjunction with, the process 300 of FIG. 3.

The process 500 assumes that a client entity is interested in signing up for recommendations to purchase electronic products, e.g., via the platform marketplace implemented by the advisory portal 214.

At 502, the platform 210 receives, via the client interface 212, information from the client entity necessary to create a client account. Here, the client entity (e.g., a customer) can enter personal information via a graphical client interface.

The platform 210 creates at 504, an account for a new client entity or updates an account for an existing client entity.

The platform 210 searches at 506, third-party resources to extract additional information about the client entity. The search can be carried out restricted to resources approved by the client entity, e.g., limited social media sites, or the client entity may permit unrestricted data mining. The platform 210 then generates at 508, a client profile based upon client-provided information at 502 and from information extracted from third-party resources at 506.

The customer profile is made available at 510, to the client entity via the client interface 212 so that the client entity can review the collected information, edit, modify, correct, augment, etc., the collected information.

At 512, the platform makes a recommendation of one or more electronic products to the client entity. For instance, the advisory portal 214 can evaluate the client entity profile, view the client entity's current products, and examine the products available within the portal marketplace. Based upon predetermined matching criteria, the advisory portal can issue a recommendation. The recommendation can be for a new product, a modification to an existing product, etc.

In example implementations, the searching at 506 is ongoing so that the client profile is constantly being updated with new information about the client entity. Thus, each time the recommender 232 executes, a new recommendation can result due to changing information about the client entity in the client profile stored in the client vault 222.

In an example implementation, the advisory portal 214 generates a profile page (e.g., in the form of a dashboard, information display screen, etc.). The client entity logs into the profile page to review recommended electronic products (e.g., a smart policy). In this regard, the client entity can review details of the recommended electronic product. In certain embodiments, the client entity is able to dive into attribution details to see the factors that drove the decisions to make the selected recommendation(s), e.g., by clicking through links provided with the attribution.

By exposing attributions, the client entity can gain confidence that an appropriate electronic product has been selected. In certain example implementations, a client entity can also evaluate a profile associated with one or more of the creator, backer entity, and decider entity.

In another example, the attributions can include details about the client entity to show what client data drove the recommendations. For instance, the electronic platform can augment the collected information about the client entity with additional information collected by automatically mining data about the client entity from third-party resources. Here, building an instrument can include generating for the identified verified product, a set of attributions, wherein the set of attributions comprises at least one of a profile generated from the collected client information, a profile generated from the additional information collected by automatically mining data, and a profile generated from a combination of the collected client information and the additional information collected by automatically mining data.

At 514, the advisory platform 214 receives a request from a client device associated with the client entity to acquire an instance of a recommended electronic product. For instance, in a practical implementation, the advisory portal 214 exposes a graphical client interface that includes a "buy now" button to purchase a selected electronic product. The client entity may also be able to browse other available electronic products and manually select products of interest.

At 516, the advisory platform receives any necessary clientselections/modifications to the selected electronic product. For instance, certain clauses may have defined outer limits, but are otherwise left as variables that are open for negotiation or modification. As another example, variables in one or more clauses may be left open-ended for filling in by the client entity (e.g., as client selected options). For example, if the electronic product is a policy, the client entity can modify a set of pre-selected coverage options. Here, the selected options can affect policy language and associated features.

At 518, the advisory portal 214 receives a transaction via the client interface 212 from the client entity, e.g., to purchase an instance of the recommended electronic product, potentially as modified by the client entity. Here, the client entity can enter payment information and confirm the purchase, e.g., via the client interface 212. A product instance is then created, which is uniquely associated with the client entity. The platform 210 can, for example, amend the updated electronic product to the blockchain.

At 520, the platform 210 sends a confirmation to a client device operated by the client entity to confirm the purchase of the electronic product. In an example configuration, the client entity can thus immediately see an update to their profile page with the subscription information. At this point, the subscription is complete, and the electronic product instance associated with the client entity is active.

In an example implementation, at a predetermined interval, e.g., at the end of a year, the electronic product self-calculates dividends. The platform can also and/or alternatively calculate dividends. The electronic product then initiates payment directly from the associated escrow account to dividend recipients. The platform 210 updates the client profile to reflect that dividends were distributed.

Process Flow 3—Example Client Claim Submittal

Figure 6:
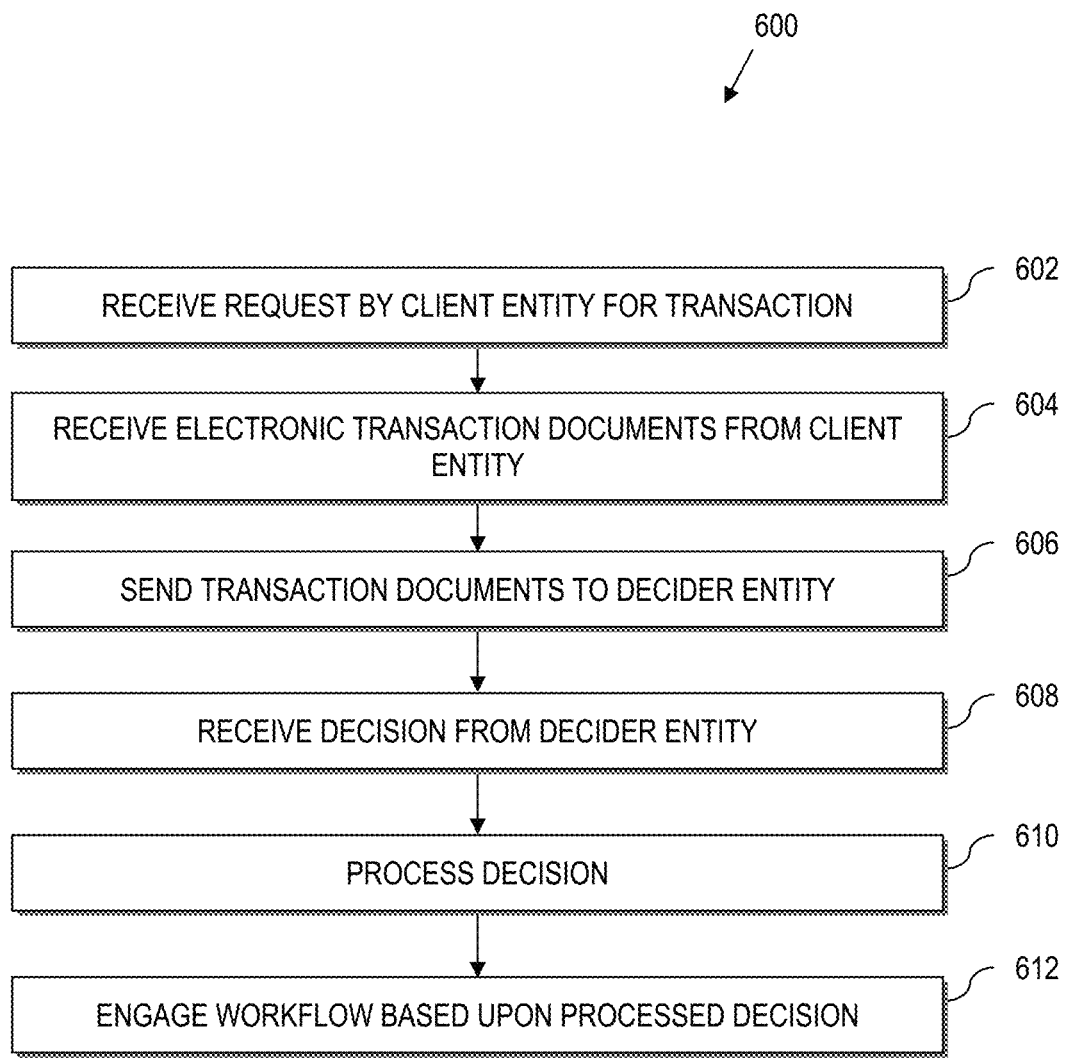
FIG. 6 is a flowchart illustrating a computer-implemented process for client interaction for claim processing with the product transaction processing system of FIG. 1 and/or the advisory portal of FIG. 2, according to aspects of the present disclosure.

Referring now to FIG. 6, a computer-implemented process 600 is provided for implementing a claim submittal process with the platform 110 (FIG. 1) or platform 210 (FIG. 2). In this regard, the computer-implemented process 600 may be implemented on computer-readable hardware that stores machine-executable program code, where the program code instructs a processor to implement the described process. The computer-implemented process 600 may also be executed by a processor coupled to memory, where the processor is programmed by program code stored in the memory, to perform the described process. Here, the process 600 can be executed on the platform 110 (FIG. 1) or the platform 210 (FIG. 2). Also, the process 600 can be implemented as part of, or in conjunction with, the process 300 of FIG. 3.

At 602, the advisory portal receives a request from a client entity (e.g., interacting via the graphical user interface of the client interface 212) for a claim against a subscribed-to electronic product. For example, the client entity can click on a "claim" button on the client entity's profile page. In response thereto, the advisory portal can present to the client entity, via the graphical user interface, an explanation of a corresponding claims process (e.g., including graphics, flows, written description, audio, video, etc.).

At 604, the advisory portal receives electronic support documents from the client entity (where available, necessary, etc.). For instance, the client entity can enter data into an on-line form presented by the advisory portal. The client entity can also upload images, video, links, and other relevant information (e.g., photos, reports, estimates, etc.). The client entity may receive a confirmation of receipt of the uploaded documentation.

At 606, the platform 210 sends the collected transaction documents to the designated decider entity. The platform 210 also sends to the decider entity, an identification of the associated electronic product, a copy of the electronic product, etc.

In an example configuration, such as where a delay is expected as the decider entity evaluates the claim (e.g., because of waiting for estimates, etc.), The client entity may receive updates of progress in the decision-making process, as well as notifications of further necessary engagement.

At 610, the platform receives a decision from the decider entity. The client entity is notified by the platform of the decision by the decider entity. In this regard, any interaction between the client entity and the decider entity may be mediated by the platform 210, or the platform 210 may allow direct communication between the decider entity and the client entity.

The platform processes the decision at 610. The decision may be to process the claim in whole, process the claim in part, or to deny the claim. Regardless, the client entity is notified of the decision against the claim, and the decider entity signs the electronic product on the blockchain.

At 612, the platform 210 engages in appropriate workflow, e.g., to provide notice to the client entity that the claim is being paid, to process a payment to the client entity or other approved entity. Here, a corresponding distributed ledger can be updated to reflect the claims decision. The client entity may also receive a confirmation from the platform that the claim has been closed. The client entity can view a record of the claim from their profile at any time.

From the perspective of the decider entity, the decider entity can receive the electronic product and incident details from the advisory portal. The incident details comprise information uploaded by the client entity at 604, documents generated by platform, documents otherwise obtained by the platform 210, or a combination thereof.

The decider entity can notify the platform via the decider interface 218-B of contact information for any additional details. Additional information can be requested via the platform 210 or directly through communication with the client entity. The decider entity may also work directly with any third parties necessary to resolve the claim. The decider entity and the platform 210 may also defend the interest of the client entity and/or the backer entity in third party disputes. The decider entity reviews the policy terms and determines an appropriate payout amount. Also, the decider entity publishes the claims decision to the electronic product and signs the decision with their private key (e.g., to update the distributed ledger). Upon verifying the authenticity of the decider entity key, the platform 210 distributes any necessary funds to the client entity, third parties, or both. The cryptography embedded in the distributed ledger ensures that there are no phony payouts.

Platform

Figure 7:
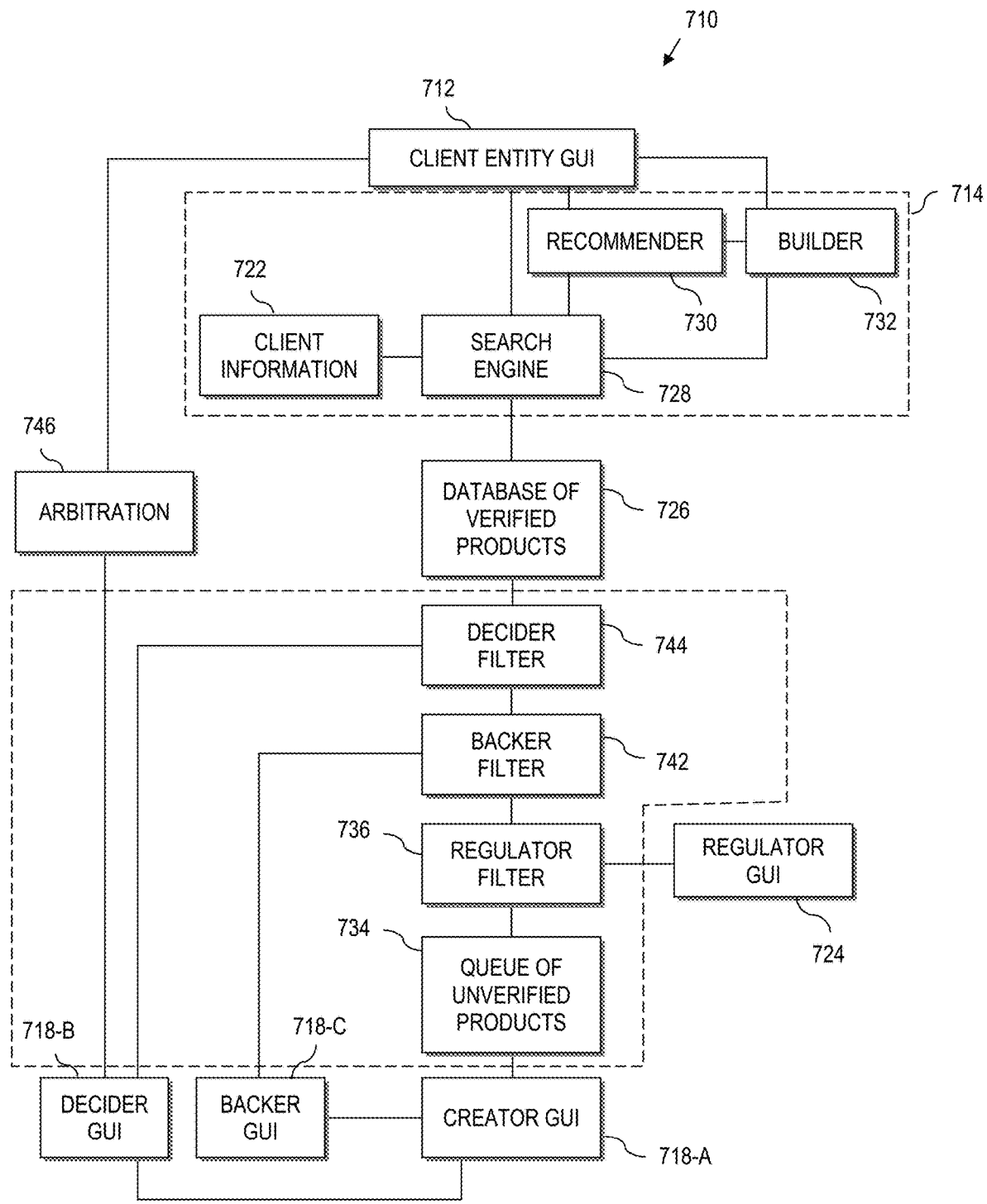
FIG. 7 is a block diagram of an electronic platform as described herein, to illustrate various participant interactions, according to various aspects of the present disclosure.

FIG. 7 is a block diagram that illustrates examples of using platforms and processes for disaggregating electronic products and building instruments from the products, as described herein, which can be implemented as part of, or in conjunction with, any of the processes and architectures described herein.

Basically, the platform 710 includes a client graphic user interface (GUI) 712, an advisory portal 714, and a product curation system 716. The client graphical user interface (GUI) 716 serves as a portal for a client entity to enter the platform. Further, the platform 710 includes client information 718, which may be supplied by the client entity directly (e.g., through a questionnaire on the client GUI 716, free-form information entered by the client entity, etc.) or may be obtained indirectly (e.g. by gathering information from websites such as social media sites/accounts, networking sites, etc.).

Using the client information, the platform 710 engages a search engine 728 to search a verified products database 726 to find products that correspond to the client information. For example, if the client entity recently posted about a recently purchased car on a social media page, then the search engine 728 could use that information to search the database 726 to find products relating to new cars.

A builder 734 builds an instrument for the client entity based on the products found that correspond to the search carried out by the search engine 728.

The product curation system 716 includes a creator GUI 718-A that serves as a portal for a creator entity to upload unverified products to eventually be stored in the database of verified products 726. The unverified product is placed within a queue 732 for a regulator entity to verify. In some instances, the regulator entity may verify the product using a regulator entity GUI 724 on the platform 710. In other cases, the products are made available to the regulator entity that can then verify the product inside or outside of the platform 710 and provide an indication that the product is verified. Thus, a regulator entity filter 736 may be used to ensure only verified products are stored in the database of verified products 726.

Further, when a product is uploaded, the product may be published to a decider entity GUI 718-B and a backer entity GUI 718-C. Thus, a backer entity may log onto the platform 710 through the backer entity GUI 718-C and offer resources associated with the product. These offers are presented to the creator GUI 718-A, so the creator entity of the product may decide on a backer entity (or more than one backer entity). If the product has a backer entity associated with it, then the product will pass through a backer entity filter 742 to be stored in the database of verified products 726.

Similarly, a decider entity may log onto the platform 710 through the decider entity GUI 718-B and offer services in the form of dispute resolution. In some instances, the decider entity is an entity logging into the decider entity portal 718-B. However, it is possible for the decider entity to be an application that uses logic trees to determine a result of a dispute. The creator entity may choose a decider entity similarly to picking a backer entity. If the product has a decider entity associated with it, then the product will pass through a decider entity filter 744 to be stored in the database of verified products 726. Further, there is no contact between the decider entity and the backer entity. As such, there is a reduction of a conflict of interest in dispute resolution, because the decider entity is not associated with anyone supplying resources to the product.

As shown, the regulator entity filter 736, the backer entity filter 742, and the decider entity filter 744 are sequential and all required for the product to be stored in the database of verified products 726. However, in some instances, any of the filters 736, 742, 744 may be removed or reordered depending on the implementation. For example, the backer entity filter 742 and the decider entity filter 744 may be located before the regulator entity filter 736. As another example, the backer entity filter 742 and the decider entity filter 744 may be omitted from the flow entirely. Another example includes omitting the regulator entity filter.

If the client entity has some actionable feedback (e.g., a dispute, a claim, etc.), then the actionable feedback is sent to the decider entity for arbitration 746. Depending on the result of the arbitration, resources associated with the product may be divvied up differently than how those resources were previously divvied up.

Building a Regulated Instrument

Figure 8:
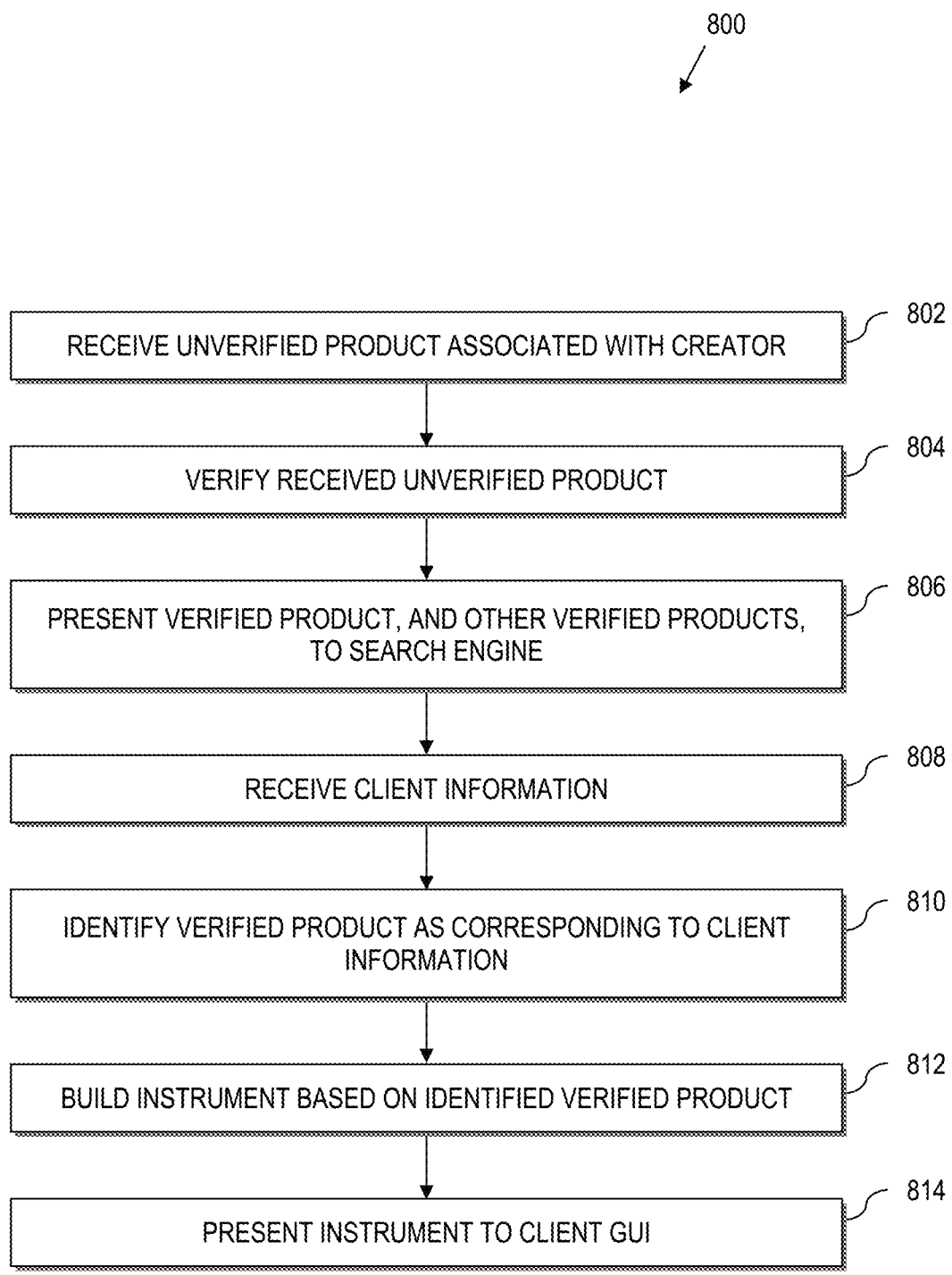
FIG. 8 is a flow chart illustrating a computer-implemented process of distributing electronic products, according to aspects of the present disclosure.

Turning now to FIG. 8, a flowchart illustrating a process 800 for creating a regulated instrument is shown. In this regard, the computer-implemented process 800 may be implemented on computer-readable hardware that stores machine-executable program code, where the program code instructs a processor to implement the described process. The computer-implemented process 800 may also be executed by a processor coupled to memory, where the processor is programmed by program code stored in the memory, to perform the described process. Here, the process 800 can be executed on the platform 110 (FIG. 1) or the platform 210 (FIG. 2). Also, the process 800 can be implemented as part of, or in conjunction with, the process 300 of FIG. 3.

At 802, an unverified product is received through a creator interface, where the unverified product is associated with a creator and includes an electronic record that defines a set of clauses. For example, a creator may log into a platform through a creator portal (e.g., a creator GUI) and upload a product. Further, the product may include unfinished portions (e.g., unpopulated portions, if/then causes that will be resolved at a later time, etc.).

At 804, the unverified product is converted to a verified product when the unverified product meets target regulations associated with the unverified product. The verification is performed independently of the creator associated with the product so as to prevent a conflict of interest. Further, the target regulations are selected based upon the defined set of clauses in the unverified product. Thus, if the product is associated with the Federal Communications Commission (FCC), then the clauses may include information about the FCC.

At 806, the verified product is added to a collection of verified products associated with a search engine. For example, the verified product may be added to a database of verified products. As another example, any products that remain unverified may be hidden from the search engine.

At 808, client information is received from a client device of the client entity, where the client entity logs onto a client portal using the client device. For example, the client information may be obtained directly from the client entity through a client interface (e.g., through a questionnaire, freeform information entered by the client entity, etc.) or may be obtained indirectly (e.g. by gathering information from third-party sources (e.g., social media, networking sites, etc.).

At 810, the search engine is used to identify a verified product from the collection of verified products based on the obtained client information. For example, if the client entity recently posted about a recently purchased car on a social media page, then the search engine could use that information to search the collection to find products relating to new cars.

At 812, an instrument is built from the identified verified product(s). In some instances, several instruments may be from the identified product. For example, if three products (A, B, C) are identified, then seven different instruments may be built using different combinations of the products: A, B, C, AB, AC, BC, ABC. Further, any unfinished portions of the product may be completed. For example, if one product that includes a conditional portion (i.e., an if/then condition), then the product may be built by resolving the conditional portion using the if/then logic. As another example, if a portion of the product is left unpopulated, then the unpopulated portion is populated automatically or with some input from the client entity (e.g., a name of an entity, a response time parameter, etc.). The resolution and/or populating may occur via self-executable code, outside the platform, or both.

At 814, the instruments are presented to a client device of the client entity. In cases where there is more than one instrument is built, a subset (i.e., all of the instruments, some of the instruments, or one of the instruments) of the built instruments may be presented to a client device of the client entity.

In some embodiments, actionable feedback may be received regarding the instrument. If the instrument is an insurance policy, the actionable feedback may be a claim submitted by the client entity. Thus, the actionable feedback may be received automatically from the instrument or through the client interface. A decider entity may then create a decision based on the actionable feedback.

In some embodiments, decider entity information may be received and associated with a product, and the product may only be added to the collection of verified products if there is a decider entity associated with the product. Similarly, backer entity information may be received and associated with a product, and the product may only be added to the collection of verified products if there is a backer entity associated with the product. As the backer entity and decider entity are independent of each other, there is a reduced risk of a conflict of interest between the two.

Reducing Conflicts of Interest

Figure 9:
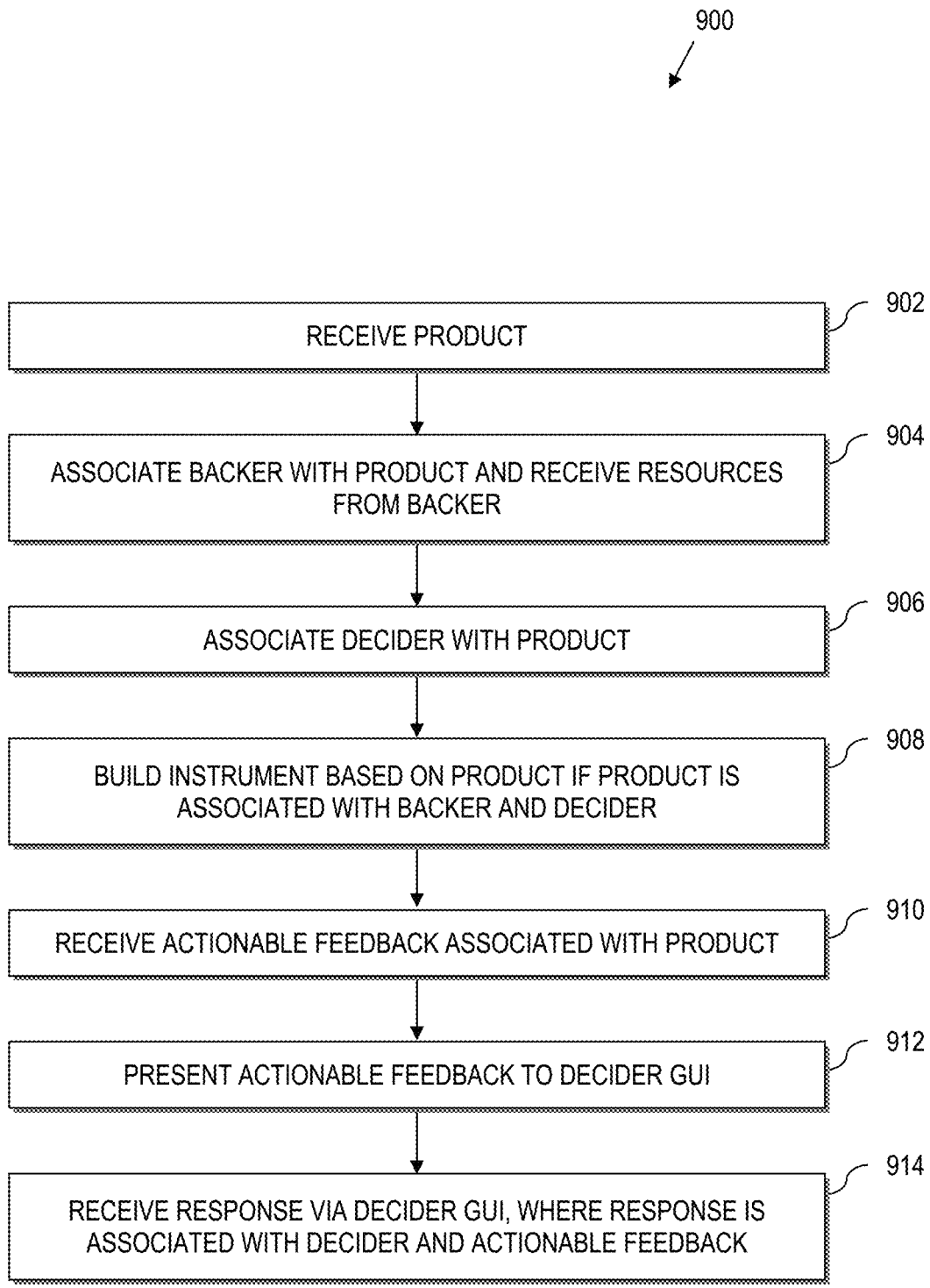
FIG. 9 is a flow chart illustrating a computer-implemented process of resolving conflicts of interest, according to aspects of the present disclosure.

Turning now to FIG. 9, a process 900 for reducing conflict of interest in online resolutions is shown. In this regard, the computer-implemented process 900 may be implemented on computer-readable hardware that stores machine-executable program code, where the program code instructs a processor to implement the described process. The computer-implemented process 900 may also be executed by a processor coupled to memory, where the processor is programmed by program code stored in the memory, to perform the described process. Here, the process 900 can be executed on the platform 110 (FIG. 1) or the platform 210 (FIG. 2). Also, the process 900 can be implemented as part of, or in conjunction with, the process 300 of FIG. 3.

At 902, a product is received from a creator entity similar to receiving a product in the process 800 of FIG. 8 above.

At 902, a backer entity is associated with the product and resources are received from the backer entity. For example, the backer entity may access the platform through a backer entity portal and offer resources (e.g., processing power, money, etc.) to the creator entity of the platform to be associated with the product. Potential backer entities are shown in a list to the creator, and the creator picks a prospective backer entity (or more than one backer entity) and associates that backer entity with the product.

At 904, a decider entity is associated with the product. Similar to the backer entities, potential decider entities are shown in a list to the creator entity, and the creator picks a prospective decider entity and associates that decider entity with the product. In some embodiments, if a backer entity is selected before the decider entity is selected by the creator, then any decider entities associated with the backer entity are removed from the list of decider entities. On the other hand, if a decider entity is selected before the backer entity is selected by the creator, then any backer entities associated with the decider entity are removed from the list of backer entities. As such, the backer entity and the decider entity should be independent of each other, which reduces a potential conflict of interest.

At 908, an instrument is built from the product if the product is associated with both a backer entity and a decider entity, and at 910, actionable feedback is received. At 912, the actionable feedback is presented to the decider entity portal (i.e., GUI). At 914, a response is received via the decider entity portal. Further, resources provided by the backer entity are distributed based on the response.

Figure 10:
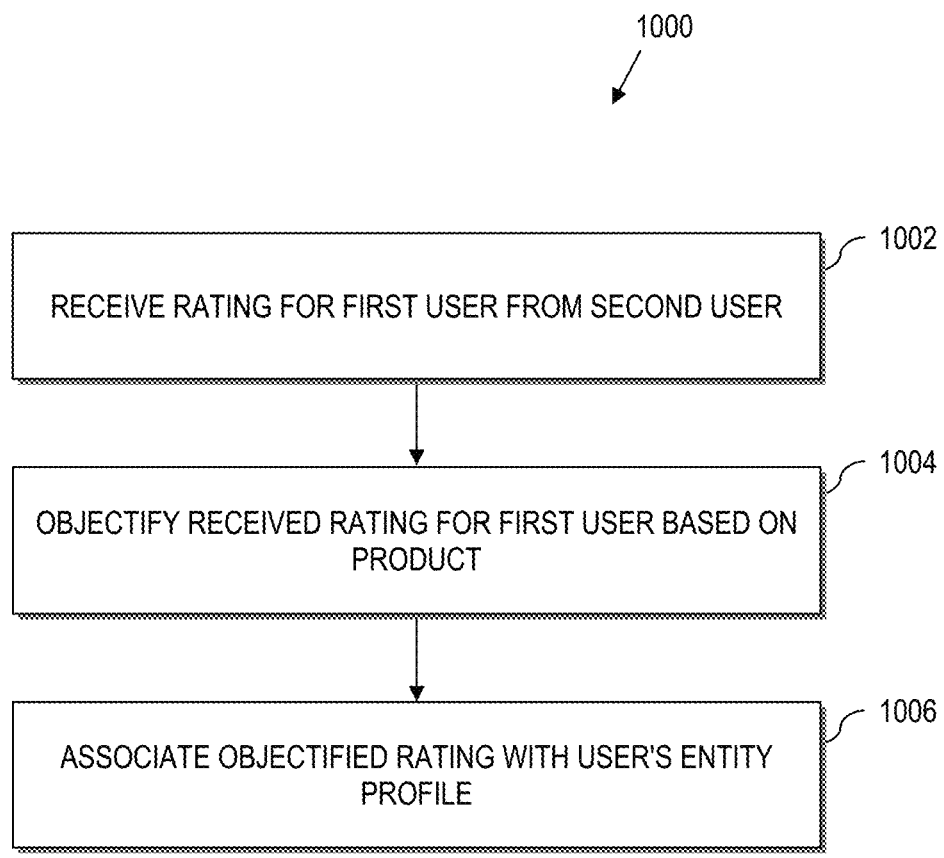
FIG. 10 is a flow chart illustrating a process for objectifying participant ratings, according to various aspects of the present disclosure.

Turning to FIG. 10, a process 1000 for objectifying an entity's rating is shown. Each user (e.g., client entity, decider entity, creator entity, etc.) using the platform may have an entity profile associated with that entity. For example, Creator_A may have a creator entity profile, Creator_B may have a separate creator entity profile, Client_X may have a client entity profile, etc. The entity profiles include a rating such that other users of the platform may rate the entity associated with the entity profile. However, such ratings form other entities may be biased and are therefore subjective. As such, the process 1000 of FIG. 10 illustrates making the subjective ratings into objective ratings (i.e., the process 1000 is for objectifying an entity's rating). It should be understood that if an entity is not associated with an entity profile before the process starts, that such an entity profile is created an associated with the entity.

At 1002, a subjective rating is received for a first user from a second user. In various embodiments, any user may provide a rating for any other user of the platform. In other embodiments, users may only rate other users if they are associated with the same product. For example, if User_A is associated with Products X, Y, and Z and User_B is not associated with any of Products X, Y, or, Z, then User_A may not rate User_B. Regardless, if a user wants to rate another user, the user may do so through that user's interface (e.g., FIG. 2 ref no. 212, 218, the regulator interface, etc.).

At 1004, the subjective rating is objectified based at least on the product. Further, the objectification may be based on a type of the first user or the second user. For example, if the first user is a decider entity and the second user is a client entity, then the client entity may rate the decider lower if the decider entity denies a claim. Thus, if such a rating is received, then the platform may adjust the low rating upwards based on the history of the claim (e.g., if the client entity did not upload any photos, if the client entity has a history of making false claims, etc.). Similar objectification formulae may be used for other permutations of the types of the first user and the second user.

At 1006, the objectified rating is associated with the first user's profile. In some embodiments, the individual subjective ratings are never shown to other users. In numerous embodiments, the subjective ratings are shown and a reason is given on why the subjective rating was objectified. For example, in the example above, there may be an indication that there was a denial of the claim, and that the user did not upload any reasoning for the claim to be submitted.

The objective ratings may be shown to all users, so the users may be informed when choosing a user to be associated with their product. For example, when choosing a decider entity, a creator may have access to the objective rating for all decider entities bidding to become a decider entity associated with the product.

Miscellaneous

According to aspects of the present disclosure, a system is provided whereby a community creates smart electronic products through the disclosed platform. The platform connects product creator entities with backer entities. The platform also coordinates with regulator entities (e.g., state regulator entities) for the approval of such electronic products. After approval (where necessary), smart electronic products become available via the platform e.g., via a marketplace. The platform finds associated client entities to subscribe to the electronic product via scanning, data mining, recommending, etc., as described more fully herein. In certain embodiments, the client entity can become a part owner of the subscribed-to electronic product and or the platform itself.

Decider Entity

Claims adjudication (i.e., feedback handled by the decider entity) can readily be separated from the creator. However, the concept of "servicing" a smart electronic product actually has multiple parts that can sit within several different parts of the platform. In an example embodiment, a human advocacy element of servicing is designated as the "advocate" organization and the gathering of evidence for adjudication the "servicer" organization, which can each have their own interface into the platform 210.

Backer Entity

In an example configuration, from the perspective of the backer entity, the backer entity can log into a backer entity portal of the product curation system 216 (or other suitable interface) to review proposals. Here, the backer entity may be able to evaluate data policies, projections, etc. The backer entity can then select specific electronic products to back. If an electronic product is associated with the backer entity, the backer entity submits wire payment to a designated escrow account. The backer entity then waits for funding to complete, and for any necessary regulator entity approval. If the corresponding electronic product is approved, the backer entity is notified of the approval, and subsequently receives payment from collected premium and from earnings from investments, e.g., at the end of each month. In this regard, the platform 210 can optionally release funds from the escrow for investment purposes. Also, at the end of a predetermined investment term, the backer entity receives back the principal paid into the escrow account, or a percentage of the principal remaining in the escrow account.

Client Experience

In the platforms disclosed herein, client experience is enriched because there is no need for client research, no phone calls, no interaction with live agents, etc. Rather, the advisory portal 214 facilitates online transacting with virtual interaction and recommendation. In this regard, the virtual nature of the advisor portal 214 allows the system to automatically scan for opportunities to save the client time, resources, money, etc. Moreover, because the advisor portal 214 interacts only with products within the marketplace of the platform 210, dynamic adjustment of products (altering existing products, adding new products, removing old products, etc.) can be carried out in a largely automated manner, creating a fluid and dynamic experience.

Client Independence

As described more fully herein, systems are provided wherein decider entities are independent of product creator entities and backer entities. For instance, in the context of insurance policies, a smart product such as a blockchain smart policy utilizes an independent decider entity to make claims decisions.

Example Computer System

Figure 11:
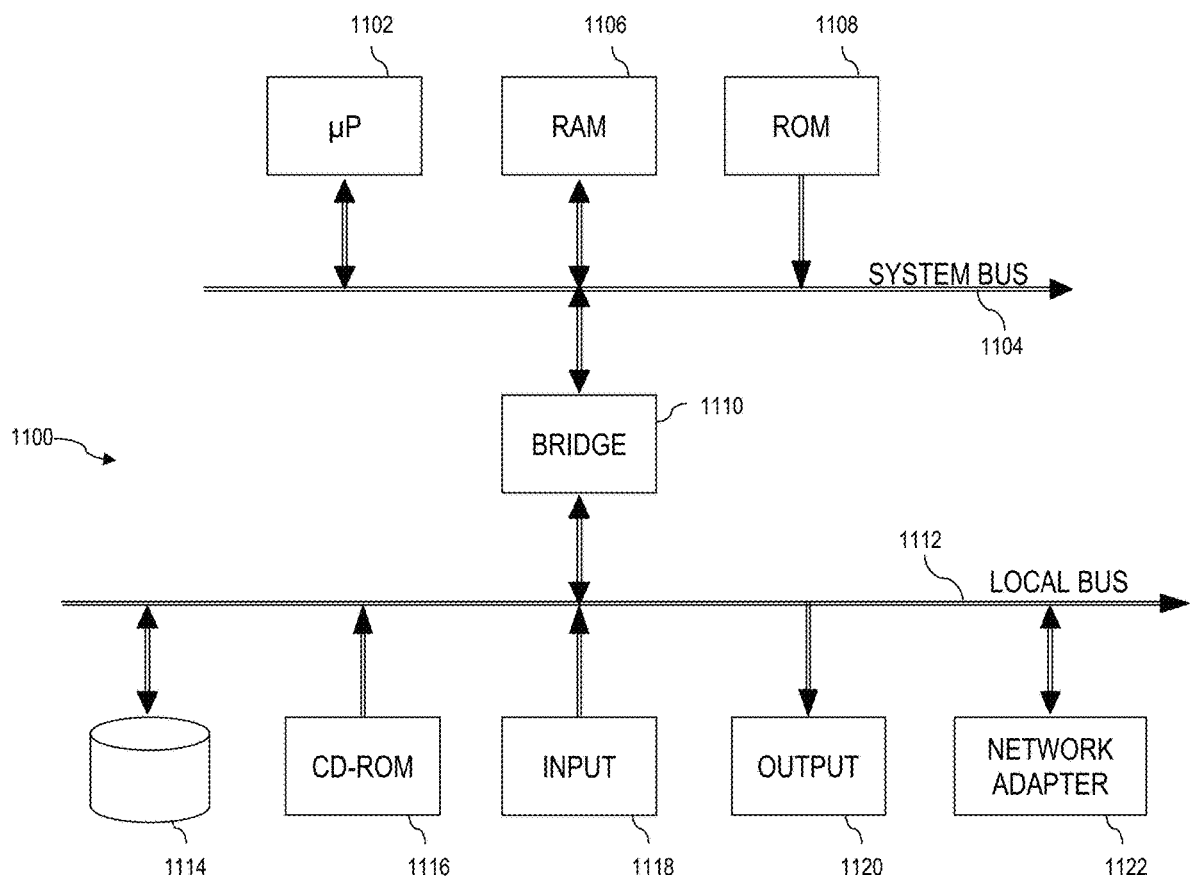
FIG. 11 is a block diagram of a computer system having a computer readable storage medium for implementing functions according to various aspects of the present disclosure.

Referring to FIG. 11, a block diagram of a hardware data processing system is depicted in accordance with the present disclosure. Data processing system 1100 may comprise a symmetric multiprocessor (SMP) system or other configuration including a plurality of processors 1102 connected to system bus 1104. Alternatively, a single processor 1102 may be employed. Also connected to the system bus 1104 is local memory, e.g., RAM 1106 and/or ROM 1108. An I/O bus bridge 1110 interfaces the system bus 1104 to an I/O bus 1112. The I/O bus 1112 is utilized to support one or more buses and corresponding devices, such as storage 1114, removable media storage 1116, input devices 1118, output devices 1120, network adapters 1122, other devices, combinations thereof, etc. For instance, a network adapter 1022 can be used to enable the data processing system 1100 to communicate with other data processing systems or remote printers or storage devices through intervening private or public networks.

The memory 1106, 1108, storage 1114, removable media storage 1116, or combinations thereof can be used to store program code that is executed by the processor(s) 1102 to implement any aspect of the present disclosure described and illustrated in the preceding FIGURES.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but not limited to, a portable computer diskette, a hard disk, a random access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction execution system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an instrument oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented process for creating and distributing verified electronic products, the process comprising:
   providing an electronic platform having:
      a client interface; and
      a set of provider interfaces, including:
         a creator interface;
         a decider interface; and
         a backer interface;
   receiving, through the creator interface, an unverified product associated with a creator entity, wherein the unverified product comprises an electronic product having a set of clauses;
   selecting a decider entity having credentials qualified by the electronic platform based upon the set of clauses, associating the selected decider entity with the unverified product, and notifying the selected decider entity of the association through the decider interface, wherein the selected decider entity interprets the set of clauses against client requests;
   selecting a backer entity having credentials qualified by the electronic platform to back the set of clauses, associating the selected backer entity with the unverified product, and notifying the selected backer entity of the association through the backer interface, wherein the selected backer entity backs decisions of the decider entity;
   converting the unverified product to a verified product after associating the unverified product with the selected decider entity and the selected backer entity by:
      delivering, to the creator entity, a unique creator key;
      delivering, to the decider entity, a unique decider entity key;
      delivering, to the backer entity, a unique backer entity key; and
      building the verified product using distributed ledger technology such that:
         each time the creator entity interacts with the verified product, the creator entity signs the interaction in the distributed ledger with the unique creator key;
         each time the decider entity interacts with the verified product, the decider entity signs the interaction in the distributed ledger with the unique decider entity key; and
         each time the backer entity interacts with the verified product, the backer entity signs the interaction in the distributed ledger with the unique backer entity key;
   publishing the verified product to the electronic platform by adding the verified product to a search engine associated with other previously verified products to define a collection of searchable verified products;
   obtaining through the client interface, information about a client entity;
   identifying a verified product from the collection of searchable verified products by interacting with the search engine based upon the obtained client information;
   building an instrument based on the identified verified product; and
   communicating the instrument to the client entity via the client interface for acceptance by the client entity.

2. The process of claim 1, wherein:
   selecting a decider entity comprises selecting a decider entity that is independent of the electronic platform and the creator entity; and
   selecting a backer entity comprises selecting a backer entity that is independent of the electronic platform, the creator entity, and the decider entity.

3. The process of claim 1 further comprising:
   augmenting the collected information about the client entity with additional information collected by automatically mining data about the client entity from third party resources;
   wherein:
      building an instrument comprises:
      generating for the identified verified product, a set of attributions, wherein the set of attributions comprises at least one of:
         a profile generated from the collected client information;

a profile generated from the additional information collected by automatically mining data; and a profile generated from a combination of the collected client information and the additional information collected by automatically mining data.

4. The process of claim 1 further comprising:
utilizing a regulator interface to interface with an independent regulator entity;
wherein:
converting the unverified product to a verified product further comprises:
converting the unverified product to a verified product when the unverified product meets target regulations as determined by the regulator entity, wherein verification is performed independently of the creator associated with the unverified product and the target regulations are selected based upon the defined set of clauses in the unverified product.

5. The process of claim 1, wherein selecting a decider entity comprises:
generating a product proposal page associated with the unverified product;
publishing the product proposal page;
receiving decider entity submissions from candidate decider entities via the decider interface; and
selecting the decider entity from the candidate decider entities.

6. The process of claim 1 further comprising:
receiving an electronic request against the verified product from the client entity via the client interface, the electronic request comprising information that relates to at least one clause of the verified electronic product;
transmitting the electronic request to the decider entity via the decider interface;
receiving an electronic decision response from the decider entity via the decider interface with regard to the electronic request;
reporting the decision response to the client entity via the client interface; and
triggering an action from the backer entity via the backer interface if the decision response from the decider entity indicates that an electronic transaction from the backer entity is required.

7. The process of claim 6 further comprising:
implementing the verified product on a distributed ledger;
updating the distributed ledger based upon the electronic request, which is digitally signed by the client entity;
updating the distributed ledger based upon the electronic decision response, which is digitally signed by the decider entity; and
updating the distributed ledger based upon the electronic transaction if required by the decision response from the backer entity, which is digitally signed by the backer entity.

8. The process of claim 6 further comprising:
creating a decider entity profile associated with the decider entity;
receiving a rating of the decider entity from at least one of: the client entity, the creator entity, and the backer entity;
objectifying the received rating using a predetermined formula based on the verified product and the decision response; and
associating the objectified rating with the decider entity profile.

9. The process of claim 1, wherein selecting a backer entity comprises:
generating a product proposal page associated with a plurality of products;
publishing the product proposal page;
receiving backer entity submissions from candidate backer entities via the backer interface; and
selecting the backer entity from the candidate backer entities.

10. The process of claim 1 further comprising:
generating a backer entity profile associated with the backer entity;
receiving a rating of the backer entity from at least one of: the client entity, the creator entity, and the decider entity;
objectifying the received rating using a predetermined formula based on the verified product and the backing of the backer entity; and
associating the objectified rating with the backer entity profile.

11. The process of claim 1 further comprising:
generating a creator profile associated with the creator entity;
receiving a rating of the creator entity from at least one of: the client entity, the decider entity, and the backer entity;
objectifying the received rating using a predetermined formula based on the verified product; and
associating the objectified rating with the creator profile.

12. The process of claim 1 further comprising:
generating a client profile associated with the client entity;
receiving a rating of the client entity from at least one of: the creator entity, the decider entity, and the backer entity;
objectifying the received rating using a predetermined formula based on the verified product and the requests of the client entity; and
associating the objectified rating with the client profile.

13. The process of claim 1, wherein:
building an instrument based on the identified verified product comprises:
building the instrument from at least a subset of the collection of searchable verified products to give the client entity at least two optional verified products, each of the at least two optional verified products having associated therewith, electronic attribution identifying why the optional verified product was identified to the instrument; and
the process further comprises:
receiving a client-response that comprises a selection associated with the at least two optional verified products.

14. The process of claim 1, wherein:
building an instrument based on the identified verified product comprises building the instrument by selecting a verified product from the collection of searchable verified products to communicate to the client entity and providing electronic attribution identifying why the verified product was selected to the instrument; and
the process further comprises receiving a client-response that comprises a selection associated with the at least two optional verified products.

15. The process of claim 1 further comprising
identifying an unpopulated portion of the verified product; and
building an instrument based on the identified verified product further comprises populating the unpopulated portion of the verified product based upon the information about the client entity.

16. The process of claim 15 further comprising:
augmenting the collected information about the client entity with additional information collected by automatically mining data about the client entity from third party resources; and
receiving input concerning the unpopulated portion of the verified product without user input based upon the additional information;
wherein populating the unpopulated portions of the product comprises populating the unpopulated portion of the product based on the received input.

17. The process of claim 1, wherein the electronic platform further comprises a portal comprising:
the search engine;
the client interface;
a product builder engine;
a client monitoring engine; and
a client vault;
wherein interacting with the search engine to identify a select verified product from the collection of searchable verified products comprises:
executing analytics by the product builder engine that interact with the search engine to identify the select verified product from the collection of searchable verified products;
monitoring and gathering, by the client monitoring engine, information about the client entity by interacting with third party resources; and
storing the gathered information about the client entity in the client vault.

18. The process of claim 1 further comprising:
generating a client profile associated with the client entity;
generating a creator profile associated with the creator entity;
generating a decider entity profile associated with the decider entity;
generating a backer entity profile associated with the backer entity;
receiving a rating from any one of the client entity, creator entity, decider entity, and backer entity can rank pertaining to any one or more of the remaining ones of the client entity, creator entity, decider entity, and backer entity;
objectifying the received rating using a predetermined formula based on the verified product; and
associating the objectified rating with corresponding one of the client profile, creator profile, decider entity profile, and backer entity profile.

* * * * *